US007123129B1

(12) United States Patent
Schrott et al.

(10) Patent No.: US 7,123,129 B1
(45) Date of Patent: *Oct. 17, 2006

(54) MODULATION OF THE RESONANT FREQUENCY OF A CIRCUIT USING AN ENERGY FIELD

(75) Inventors: Alejandro Gabriel Schrott, New York, NY (US); Richard Joseph Gambino, Stony Brook, NY (US); Robert Jacob Von Gutfeld, New York, NY (US)

(73) Assignee: Intermec IP Corp., Everett, WA (US)

( * ) Notice: Subject to any disclaimer, the term of this patent is extended or adjusted under 35 U.S.C. 154(b) by 68 days.

This patent is subject to a terminal disclaimer.

(21) Appl. No.: 10/391,515

(22) Filed: Mar. 18, 2003

Related U.S. Application Data

(63) Continuation of application No. 09/136,157, filed on Aug. 18, 1998, now Pat. No. 6,535,108, which is a continuation of application No. 08/569,375, filed on Dec. 8, 1995, now Pat. No. 5,812,065, which is a continuation-in-part of application No. 08/514,705, filed on Aug. 14, 1995, now abandoned.

(51) Int. Cl.
*H04Q 5/22* (2006.01)
(52) U.S. Cl. .................. 340/10.1; 340/10.34; 340/5.8; 340/572.5; 340/505; 235/380
(58) Field of Classification Search .............. 340/10.1, 340/5.8, 505, 572.5, 10.3, 10.34, 5.61, 572.1, 340/572.6; 235/380, 492; 70/5.71, 57.1; 367/6; 342/42, 44, 51
See application file for complete search history.

(56) References Cited

U.S. PATENT DOCUMENTS

| 3,196,440 A | | 7/1965 | Weinstein | |
|---|---|---|---|---|
| 3,299,424 A | * | 1/1967 | Vinding | 340/10.3 |
| 3,427,614 A | * | 2/1969 | Vinding | 340/870.31 |
| 3,500,375 A | | 3/1970 | Minasy | |
| 3,755,803 A | | 8/1973 | Cole et al. | |
| 3,810,147 A | | 5/1974 | Lichtblau | |

(Continued)

FOREIGN PATENT DOCUMENTS

DE     4338554     5/1994

(Continued)

OTHER PUBLICATIONS

NL 8903-220-A (91-228416/31) Derwent Publications Ltd. London, England: 1991 "EM mechanical, resonator detecting shop lifter—vibrates audibly when exposed to magnetic field". [abstract].

(Continued)

*Primary Examiner*—Edwin C. Holloway, III

(57) ABSTRACT

A transponder has a resonant RLC circuit with one or more electromagnetic energy storage components that vary in response to an externally applied modulating energy field. In addition to the externally modulating energy field, a base station transmits a carrier signal with a frequency essentially the same as the quiescent resonant frequency of the RLC circuit. As the component(s) vary, the resonant frequency of the RLC circuit changes, modulating the carrier signal with the external modulating energy field. Effects of the modulation are detected by the base station. Information (e.g., the presence of a tag) is obtained by receiving and demodulating the modulated signal at the base station. One or more or the circuit elements (e.g., different preferred embodiments of one or more capacitors, inductors, and resistors) can be varied (e.g. mechanically) to modulate the carrier signal. This allows the resonant circuit to modulate the carrier signal with multiple modulation frequencies to encode multiple bits of information on the carrier.

50 Claims, 12 Drawing Sheets

U.S. PATENT DOCUMENTS

| | | | |
|---|---|---|---|
| 3,828,337 A | 8/1974 | Lichtblau | |
| 4,079,360 A | 3/1978 | Ookubo et al. | |
| 4,160,971 A * | 7/1979 | Jones et al. | 340/870.26 |
| 4,209,783 A * | 6/1980 | Ohyama et al. | 340/825 |
| 4,341,189 A | 7/1982 | Yamaguchi et al. | |
| 4,361,153 A * | 11/1982 | Slocum et al. | 607/32 |
| 4,388,524 A | 6/1983 | Walton | |
| 4,447,781 A | 5/1984 | Van Dyke | |
| 4,465,047 A | 8/1984 | Yamaguchi et al. | |
| 4,476,454 A | 10/1984 | Aboafet et al. | |
| 4,510,490 A | 4/1985 | Anderson, III et al. | |
| 4,618,822 A * | 10/1986 | Hansen | 324/207.16 |
| 4,618,861 A * | 10/1986 | Gettens et al. | 340/10.41 |
| 4,647,917 A | 3/1987 | Anderson, III et al. | |
| 4,658,252 A * | 4/1987 | Rowe | 340/5.63 |
| 4,670,740 A * | 6/1987 | Herman et al. | 340/572.2 |
| 4,673,932 A * | 6/1987 | Ekchian et al. | 340/10.32 |
| 4,745,401 A | 5/1988 | Montean | |
| 4,835,524 A | 5/1989 | Lamond et al. | |
| 4,940,966 A | 7/1990 | Pettigrew et al. | |
| 4,999,609 A | 3/1991 | Crossfield | |
| 5,001,458 A | 3/1991 | Tyren et al. | |
| 5,001,993 A | 3/1991 | Brand | |
| 5,038,130 A | 8/1991 | Eck et al. | |
| 5,055,786 A | 10/1991 | Wakatsuki et al. | |
| 5,081,445 A | 1/1992 | Gill et al. | |
| 5,111,186 A | 5/1992 | Narlow | |
| 5,153,562 A * | 10/1992 | van Breemen | 340/572.3 |
| 5,166,612 A | 11/1992 | Murdock | |
| 5,204,681 A | 4/1993 | Greene | |
| 5,218,189 A | 6/1993 | Huchison | |
| 5,235,326 A | 8/1993 | Beigel et al. | |
| 5,257,009 A | 10/1993 | Narlow | |
| 5,276,431 A | 1/1994 | Piccoli et al. | |
| 5,341,118 A | 8/1994 | Parkin et al. | |
| 5,381,137 A | 1/1995 | Gheam et al. | |
| 5,420,569 A | 5/1995 | Dames et al. | |
| 5,440,300 A * | 8/1995 | Spillman, Jr. | 340/10.34 |
| 5,446,447 A | 8/1995 | Carney et al. | |
| 5,450,492 A | 9/1995 | Hook et al. | |
| 5,517,179 A * | 5/1996 | Charlot, Jr. | 340/572.2 |
| 5,523,749 A * | 6/1996 | Cole et al. | 340/10.34 |
| 5,538,803 A | 7/1996 | Gambino et al. | |
| 5,550,536 A | 8/1996 | Flaxl | |
| 5,552,778 A | 9/1996 | Schrott et al. | |
| 5,554,974 A | 9/1996 | Brady et al. | |
| 5,559,507 A | 9/1996 | Beigel et al. | |
| 5,563,583 A | 10/1996 | Brady et al. | |
| 5,565,847 A | 10/1996 | Gambino et al. | |
| 5,581,257 A | 12/1996 | Greene et al. | |
| 5,680,106 A * | 10/1997 | Schrott et al. | 340/10.33 |
| 5,812,065 A | 9/1998 | Schrott et al. | |
| 6,535,108 B1 | 3/2003 | Schrott et al. | |

FOREIGN PATENT DOCUMENTS

GB 2101455 1/1983

OTHER PUBLICATIONS

T. Klinger et al.; Magnetostrictive Amorphous Sensor for Biomedical Monitoring; IEEE Transactions on Magnetics. vol. 28, No. 5, Sep. 1992: pp. 2400-2402.

IBM Technical Disclosure Bulletin Speech coder utilizing semiconductors cantilevers. Jan. 1968, vol. 10, No. 8, p. 1259.

* cited by examiner

MODULATION OF THE RESONANT FREQUENCY OF A CIRCUIT USING AN ENERGY FIELD

CROSS REFERENCE TO RELATED APPLICATIONS

This application is a continuation of patent application Ser. No. 09/136,157 filed Aug. 18, 1998, now U.S. Pat. No. 6,535,108 issued Mar. 18, 2003, which is a continuation of patent application Ser. No. 08/569,375 filed Dec. 8, 1995, now U.S. Pat. No. 5,812,065 issued Sep. 22, 1998, which is a continuation-in-part of patent application Ser. No. 08/514,705 filed on Aug. 14, 1995, now abandoned.

FIELD OF THE INVENTION

This invention relates to the field of modulating a carrier frequency with a modulating signal. More specifically, the invention relates to the modulation of a carrier frequency of a resonant circuit used in radio frequency tagging.

BACKGROUND OF THE INVENTION

A resonant circuit is one in which the values or circuit resistance, R, capacitance, C, and inductance, L, are chosen such that the reactance of the resonant circuit is a minimum at a resonant frequency.

In amplitude modulated radio reception, the antenna circuit is tuned to resonate with the carrier frequency of the particular radio frequency circuit. This tuning to resonance or near resonance of the RF antenna circuit provides a means for discriminating against the many other carrier frequencies used by other broadcasting stations, thereby allowing the listener to choose one station without interference from the others broadcasting simultaneously.

Information content is impressed op the carrier via a mixing scheme known as modulation in which a nonlinear element combines the carrier with the frequencies containing the information to yield a sum and difference frequency signal. This mixing process takes place at the broadcast station. The information is subsequently retrieved by an amplitude modulated radio receiver which separates the carrier via rectification and filtering leaving only the information signal, a method generally referred to as demodulation. Other types of modulating and demodulating circuits are well known, e.g., circuits using frequency modulation, and pulse modulation.

In prior Radio Frequency (RF) tagging art, a resonant circuit is disposed on a thin insulating dielectric substrate to form a tag for use in electronic article detection (EAS) schemes. Generally, the coil of the resonant circuit consists of a closed loop of a conducting element which has a certain value of resistance and inductance. A capacitive element which forms part of this closed loop consists of two separate areas of thin metal conducting film disposed on opposite sides of the dielectric. The tag is attached to articles to be protected from theft. An RF signal at or near the resonant frequency of the resonant circuit is emitted from a base station. When the tag is in the RF field, the tag's absorption can lead to a change in the tank circuit current of the base station and a power dip in a receiving coil. Either one of these two effects can be used to sense the presence of the tag and hence the item to which it is attached. Thus, an alarm can be made to sound when either of these effects are sensed by a pickup coil or by an amplifier, indicating improper removal of an item. To deactivate the tag, a relatively high RF power pulse can be applied at the counter at which the point-of-sale of the item takes place. This high power acts to short the capacitor or burn out a weak portion of the coil. In either case, the circuit is no longer resonant and will not respond to the RF interrogation from the base station. In that case, the customer who has made a legitimate purchase at the point-of-sale counter can pass through the interrogation-sensing gate without setting off an alarm. It is clear from this description that these tags, once deactivated, are not reusable. In addition, in the configuration just described, the tags are capable of only conveying one bit of information. Thus, they cannot give any information regarding the item's identification and are useful only for anti-theft applications. This kind of tag is normally classified as a single bit tag.

Some RF tags consist of a resonant coil or a double sided coil containing two thin film capacitors with the plate of each capacitor on opposite sides of the dielectric. Such tags can be used for source tagging and have an initial frequency that is different from the frequency used at the retail establishment for theft protection. For example, in U.S. Pat. No. 5,081,445 (assigned to Checkpoint), the tag is designated as being in a deactivated state until the first capacitor is shorted by means of a high power RF pulse at the then resonant frequency. Disabling the capacitor shifts the resonant frequency of the RF circuit to the store interrogation frequency. A second deactivation pulse is used to disable the second capacitor at the point-of-sale when payment is received for the item to which the tag is attached. At this stage, the tag is no longer usable and has been permanently destroyed.

Some additional art discloses two or more frequencies that can be obtained on a RF coil tag by altering the capacitance of the circuit. In one case, a strong DC electric field is applied to change the effective dielectric constant of the capacitor. Thus, the circuit has two resonant frequencies depending on the value of the applied electric field. Due to the ferroelectric hysteresis, the tag can be deactivated by the application of a DC field. However, it can also be reactivated and hence re-used by applying a DC field of opposite polarity (U.S. Pat. No. 5,257,009, assigned to Sensormatic). In an earlier embodiment, a set of capacitors connected in parallel attached to an inductance have been described in U.S. Pat. No. 5,111,186 assigned to Sensormatic in which each dielectric of the set of capacitors varies in thickness. In this manner, a series or resonant frequencies can be obtained by applying different voltages (electric fields). Each of the capacitors then changes capacitance at a different electric field (voltage) levels depending on the thickness of the dielectric. There can be some concern regarding the high voltages required for creating the change in the dielectric. Also, using this apparatus, the remanent state of ferroelectrics tends not to be very stable for long periods of time. Additional concern relates to the dielectrics, which are also piezoelectric materials which have properties quite sensitive to stress.

U.S. Pat. No. 5,218,189, assigned to Checkpoint, provides an array of series capacitors connected in parallel with an inductor. Here, the resonance can be altered by selectively shorting one or more of the capacitors, thereby changing the resonant frequency of the resulting circuit. A frequency code can thereby be established by disabling or burning out selective capacitors at the time of interrogation, those capacitors becoming disabled which at the time of manufacture of the tag were "dimpled". The disadvantage is that the item or person is subject to high r.f. fields during interrogation. Also, the range of frequencies that needs to be scanned is necessarily large. This makes detection difficult since the requirement to scan a large band of frequencies puts a strong demand on the flat response of the detector circuit.

U.S. Pat. No. 4,745,401 describes an embodiment for a reusable tag. It is comprised of two ferromagnetic elements, one soft (low coercivity) and one hard (high coercivity) both physically covering a portion or an R.F. coil. The ferromagnetic element with high coercivity can be magnetized to apply a bias field to the sort material to put the latter into saturation. In that state, the R.F. field generates very small hysteresis losses leading to a relatively high Q of the tag circuit. On the other hand, when the hard magnet is demagnetized, the RF field results in hysteresis losses in the soft material which lowers the Q of the circuit. This change in Q can be used to determine whether a tag is active or has been deactivated. While this constitutes a reusable tag, the change in Q tends to be small and thereby some what more difficult to distinguish from other effects that attenuate the absorption.

In U.S. Pat. No. 3,500,373 an apparatus is described for interrogating and sensing the presence of a RF resonant tag. Here the interrogating frequency is swept around a center frequency. In general, there is very little radiation emitted except when the tag is present in the field of the emitter. Thus, when there is no tag in the antenna field, very little energy is lost from the antenna circuit. When the swept frequency coincides with the resonant frequency of an active tag, energy is absorbed and a sensing circuit detects a drop in voltage level in the interrogating antenna oscillator circuit. The tag absorption occurs twice with every complete sweep cycle resulting in a negative dip in the oscillator circuit. The negative dip causes pulse modulation which is filtered, demodulated and amplified to cause an alarm to be activated, indicating theft of an item. Thus, the basic detection is achieved by varying the interrogation carrier frequency to match the resonance of a tag whose center frequencies span a range depending on the type or make of tag.

STATEMENT OF PROBLEMS WITH THE PRIOR ART

As already stated, the above prior art senses changes in the resonant state of a tag, either by changing its Q or changing the frequency of the tag circuit. The cited embodiments are detected by way of sensing the change in the magnitude of the tag absorption at the resonant frequency or a change in the Q of the tag circuit. However, since these tags generally operate in the MHz regime, they are easily shielded so that the signal both to and from the tag is readily attenuated. Since sensing the tag relies strongly on the absorption of the carrier and the frequency spectrum of the pulse occurring during the frequency sweep, pulse detection has difficulties under a variety or conditions. Sweeping introduces harmonics or higher frequencies so that the signal to noise is degraded. Therefore, the demodulation of the carrier containing the pulse as a result of the tag in the field of the swept carrier necessarily contains more noise than a carrier modulated by a quasi cw sine wave. For some tags, it may also be hard to distinguish a change in Q from a change in position or orientation of the tag relative to the RF field direction. Therefore, these prior art tags can produce weak signals that are difficult to discriminate at the base station (transceiver).

Many of the prior art RF tags are limited to one bit or information and are not reusable. Many of the reusable tags in the prior art require the use of very strong fields.

OBJECTS OF THE INVENTION

An object of this invention is an improved radio frequency (RF) tag transponder.

An object of this invention is an improved, reusable RF tag with one or more bits of information.

Another object of this invention is an improved, reusable RF tag that creates a dependable and easy to discriminate signal at the base station.

An object of this invention is a tag with a reusable resonant circuit that is capable of modulating a carrier signal with one or more discrete and highly detectable modulating frequencies of an applied energy field.

SUMMARY OF THE INVENTION

The present invention is a transponder apparatus that uses a resonant circuit with one or more variable circuit components. The resonant circuit has a resonance frequency at or near the frequency of a radio frequency (RF) carrier.

A system and a method can include a base station that communicates with the transponder by using an RF carrier.

The base station interrogates the resonant circuit by using an RF carrier signal with a frequency at which the resonant circuit resonates and a modulating signal that cause one or more components of the resonant circuit to vary at a component frequency there by varying the resonance frequency of the resonance circuit. As the resonance frequency of the resonance circuit varies, the RF carrier signal is modulated by the modulating signal.

The values of one or more of the components (resistance, inductance, and capacitance) of the resonant circuit are varied by one or more remote modulating signals. The modulating signals are transmitted from a location (or locations) remote from the resonant circuit. The modulating signals are external energy fields that vary continually without interruption over a period of time in magnitude and/or frequency at a modulating signal frequency. For example, the modulating signal can be an acoustic field or an audio frequency electromagnetic field.

In many of the preferred embodiments, the varying component value(s) of the resonant circuit vary due to a mechanical change of the component. The mechanical change of the component (at the component frequency), and therefore the change in value of the component, varies most when the frequency of the force produced by the modulating signal(s) is equal to one of the mechanical resonances of the varying component(s) of the resonant circuit.

The modulated RF carrier is demodulated, typically at the base station, by using a receiver (demodulator) tuned to demodulate the carrier to obtain the encoded information (like the modulating signal) from the carrier.

Various novel preferred embodiments of these variable components of the resonant circuit are disclosed, including capacitors with vibrating plates (physically constrained in various ways, e.g. as a cantilever, sliding plate, etc.); inductors with variable permeability and/or mutual inductance; and variable resistance.

In a preferred embodiment, the resonant circuit is used in a radio frequency (RF) tag. Various preferred embodiments of the RF tag include means for establishing a code of one or more bits by introducing one or more variable components of the RLC circuit. Each component has mechanical resonance or a state that responds more at one of the modulating signal frequencies than at other frequencies. An RF tag with multiple bits is made by using components of the RLC circuit with different states on a single RF tag.

In a preferred embodiment, the system and tag transponders are used for anti-theft protection as well as item identification. In addition, the system includes means for interrogating and detecting the device to retrieve the information carried by the tag.

BRIEF DESCRIPTION OF THE DRAWINGS

The foregoing and other objects, aspects and advantages will be better understood from the following detailed description of preferred embodiments of the invention with reference to the drawings as follows.

DETAILED DESCRIPTION OF THE INVENTION

Figure 1:
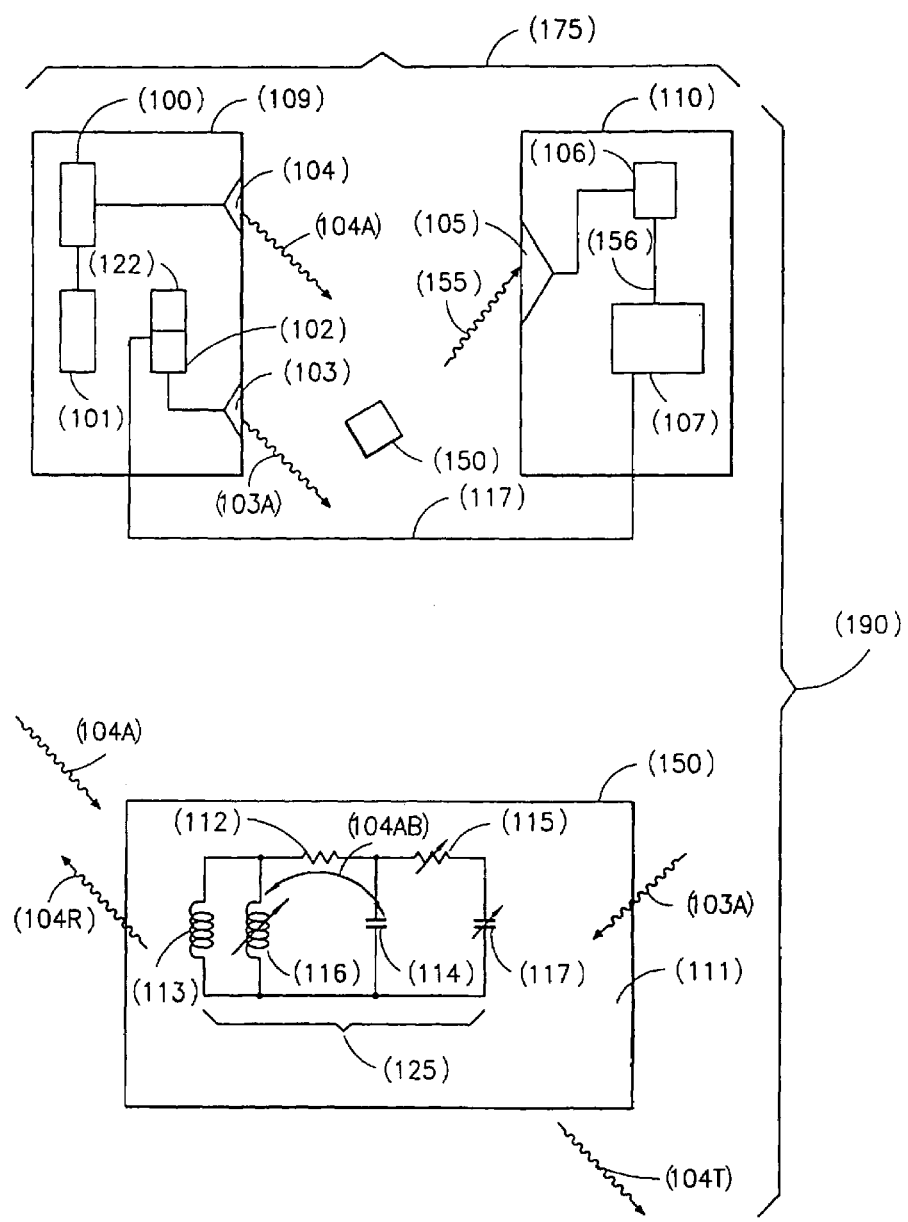
FIG. 1 is a diagram of hardware for a preferred base station used to excite a novel remote transponder having a resonant circuit.

The present system (190) shown in FIG. 1 includes a novel transponder/tag (150) comprising a resonant circuit (125). The resonant circuit (125) has the fixed components of resistance, R (112), inductance L (113), and capacitance C (114) and one or more variable components of resistance R (115), inductance L (116), and/or capacitance C (117) which may be modified by an external modulating signal (103A). In addition, the system (190) includes a base station (175), provided for interrogating the resonant circuit (125), used as a transponder and/or an RF tag (150).

The base station (175) includes a transmitter (109) for transmitting the RF carrier signal (104A) and the modulating signal (103A) and a receiver (110) for receiving and demodulating the modulated carrier signal (155), i.e., the carrier signal (104A) modulated with the modulating signal (103A) by the transponder/tag 150.

The transmitter (109) comprises an RF carrier generator (101), RF carrier amplifier (100), RF carrier antenna (104), a modulating signal generator (102), a modulating amplifier (122), and modulating signal antenna (103). The RF carrier generator (101), amplifier (100), and antenna (103) produce the RF carrier (104A). Equipment like this is well known in the radio frequency transmission arts. The modulating signal generator (102) and the antenna (103) produce an external modulating energy field (103A), for varying one or more of the variable circuit components (115, 116, 117) of the resonant circuit/tag (150). Since the energy field (103A) is produced in the base station (175), it is produced externally or remotely from the transponder/tag (150). The externally applied modulating field/signal (103A) can include any acoustic, magnetic and/or electromagnetic field (103A) necessary to vary the variable components (115, 116, and 117) as described below. The modulating signal generator (102) and the antenna (103) would be designed to produce this specific modulating signal (103A). For example, if the modulating signal (103A) is an acoustic energy field, the signal generator (102) would be an audio frequency electromagnetic signal generator and the antenna (103) would be a loud speaker. If the modulating signal (103A) is an electromagnetic field, the signal generator (102) would be an RF signal generator and the antenna (103) would be an RF antenna.

By varying/exciting these variable resonant circuit (150) elements (115,116,117) with the modulating signal (103A), the RF carrier frequency (104A) is modulated to produce the modulated carrier signal (155). The modulated carrier (155) signal is sensed by a receiver (110) of the base station (175) through the receiving antenna (105). The receiver demodulator (106) demodulates the modulated carrier signal (155) and amplifies the demodulated signal (156) to retrieve the information, e.g., the modulating signal (103A) from the tag (150). Typically, this information indicates that a transponder/tag (150) is present in the field (103A, 104A) range of the base station (175) because only the transponder/tag (150) would modulate the carrier (104A) with the modulating signal (103A). Alternatively, the information can be a distinct frequency or frequencies that are modulated on the carrier (104A) by the transponder (150) as determined by the response of the variable components (115, 116, 117) to the modulating signal (103A) which is swept through a range of frequencies. Generally, the retrieved information (156) is the demodulated signal derived from the carrier (104A) that was modulated at one or more modulating signals (103A) by the resonant circuit of the transponder/tag (150).

A typical demodulating scheme will utilize a superheterodyne receiver and amplitude modulation. Any demodulated signal is transmitted via an interface to a computer (107) to interpret the code, i.e., retrieval information (distinct frequency or frequencies) (156) impressed by resonance circuit (150) on the carrier (104A). This code is the presence or absence of one or more modulating signals (103A) modulated or not modulated on the carrier frequency (104A) by the resonant circuit (150).

In the quiescent state, i.e. when the modulating signal (103A) is not varying any of the variable components (115–117), of the resonant circuit (125) the values of the fixed circuit elements, R (112), L (113) and C (114) in combination with a quiescent value of each variable component (115–117) determine the tag's resonant frequency which is also the frequency of the RF carrier signal (104A). To interrogate the tag, the carrier signal (104A) at carrier frequency (104A) is applied to the tag (150). Simultaneously, the modulating field or signal (103A) is applied to alter the resonance frequency of the resonance circuit by changing one or more of the variable components (115–117). Typically, the variable components vary at a component frequency, i.e., the components vary continually in a period of time. As described in some preferred embodiments below, the component frequency may or may not be the same frequency as one of the mechanical resonance frequencies of the component.

Disclosed below are alternative preferred embodiments of variable components (115–117) of the resonant circuit (125) that are varied using the modulating signal (103A).

Figure 2A:
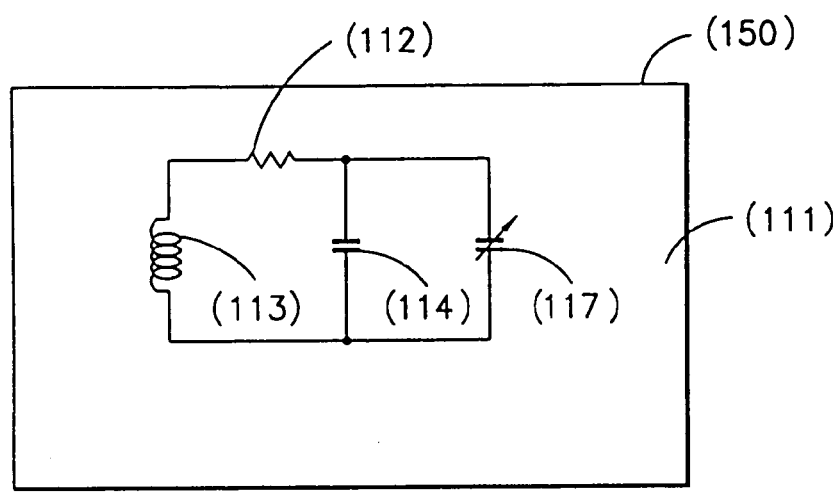
FIG. 2A shows the RF resonant circuit where the variable component element is a variable capacitor made to vary by the modulating signal(s).

A preferred transponder/tag embodiment with a variable capacitor component (117) is shown schematically in FIG. 2A. Here the variable element is a variable capacitor (117). In alternative preferred embodiments, the capacitor component (117) variation can be achieved by changing the spacing between the capacitor (117) plates and/or the overlap of the two plates. In these capacitor configurations, the overlap is the projection of one plate onto the second plate. Thus, this overlap region defines the plates of the modulating capacitor. The variable capacitor (117) shown in FIG. 2A, comprises two plates, at least one that can move continually with time with respect to the other due to the modulating field/signal (103A) giving rise to a continuous change in the spacing or gap between the plates and/or the overlap of the plates with respect to one another. In general the movement between the plates can be parallel to the planes defined by the plates or at any angle with respect to the plane of one of the plates. The movable plate can be constrained by boundary conditions to affect its response to the modulating signal (103A). One or more of such capacitors can be utilized, each of which can have a distinct response to the external excitation, i.e., the modulating signal (103A). In general, the plates of the capacitor are made from any electrical conductive material including metals, like copper, etc.; conductive polymers; bimorphs (see below); etc.

Figure 2B:
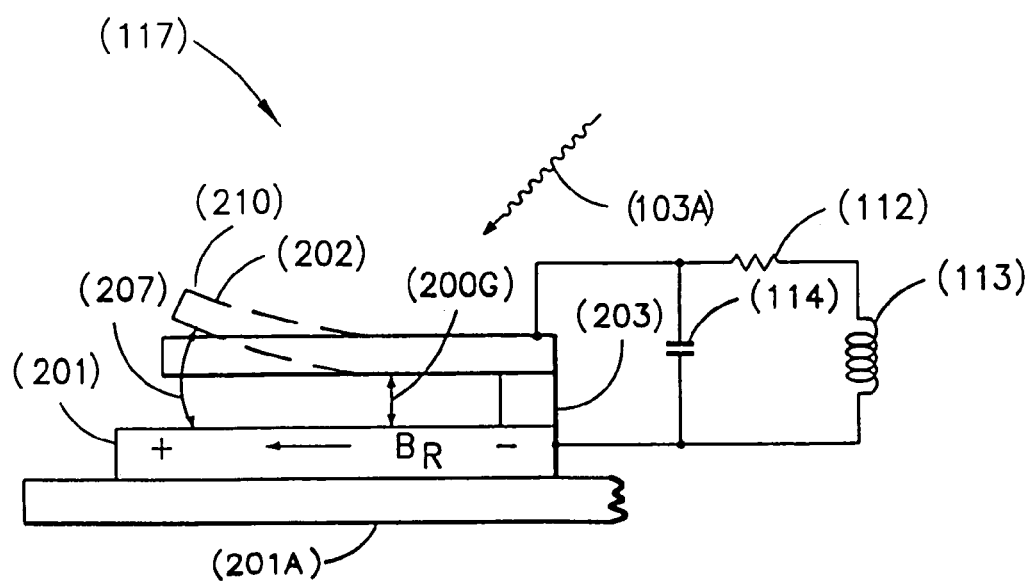
FIG. 2B is a side view of a cantilever used as one plate of a preferred embodiment of the variable capacitor component, where the cantilever is caused to vibrate by the modulating signal(s).

FIG. 2B shows a typical parallel plate capacitor where one plate (201) is unmovably fixed to a substrate (201A), a second plate (202) is clamped at one of its ends (boundary condition) to an insulating support (203) that is also affixed to the substrate (201A) and/or the first plate (201). In this arrangement, the top, movable plate (202) comprises a cantilever with a well defined set of mechanical resonances which depend on the boundary conditions (clamped at one end) and the cantilever length, thickness, material density and bulk modulus. In general, such a cantilever can be excited by modulating signal (103A), e.g., an acoustic wave or magnetic field at any of the cantilever mechanical resonance frequencies. Therefore, when excited by the modulating signal (103A) with a frequency approaching one of these mechanical resonance frequencies, the response, i.e. movement of the free end or vibration, of the cantilever plate (202) varies the quiescent spacing or gap (200G) between the plates (201, 202), typically on the order of 250 microns. The spacing variation (207) is a maximum when the frequency of the modulating signal (103A) is equal to one of the mechanical resonance frequencies of the cantilever. Accordingly, when the frequency of the modulating field/signal (103A) is equal or near to a mechanical resonance frequency of the the variable capacitor (117), in FIG. 2B a cantilever, the change in capacitance of the capacitor (117) and hence the change in the resonance frequency of the resonant circuit (125) is the greatest.

Acoustic waves apply oscillatory pressure variations on the cantilever setting it into resonant vibration when the excitation frequency of the modulating signal (103A) coincides with mechanical resonant frequencies of the cantilever. In this embodiment, an acoustic loudspeaker (103) and audio oscillator (102) correspond respectively to the modulating signal generator (102) and antenna (103) in FIG. 1. Such mechanical excitation (modulating signal (103A)) will produce a change in the capacitance at the frequency of the mechanical resonance of the cantilever and consequently result in a change of the tag's (150) unperturbed or quiescent state resonance. When the resonant circuit (125) is resonating at the carrier frequency (104A) and the external modulating signal (103A) is applied at a frequency that causes modulating element (117) to mechanically resonate, the RF carrier signal (104A), along with the RF reflected signal (104R), the RF absorbed signal (104AB), and the RF transmittal signal (104T), are modulated at the mechanical resonance frequency, i.e., the frequency of the external modulating signal (103A).

Figure 2C:
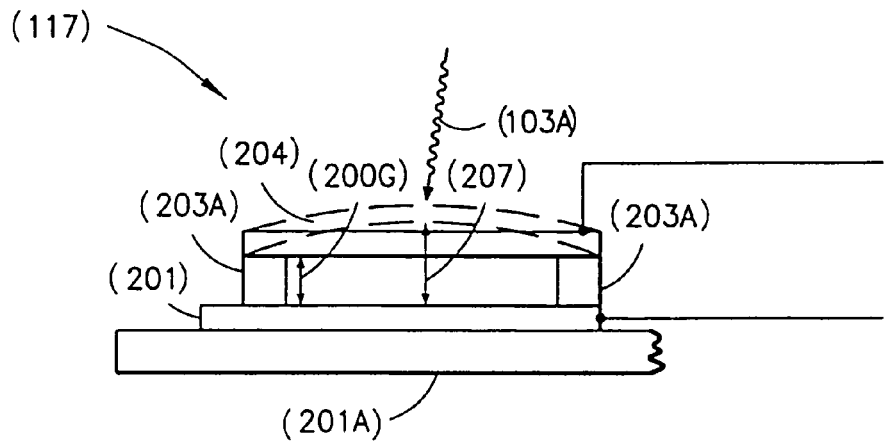
FIG. 2C is a side view of a bar with both ends clamped acting as one plate of a preferred embodiment of the variable capacitor component, where the clamped bar is caused to vibrate by the modulating signal(s).

See FIG. 2C. In place of the cantilever, a thin bar (204) of material can be used. This bar is mechanically clamped (203A) at both ends with an electrically insulating material (203A) such that its instantaneous spacing (207) due to its bending or bowing motion can be used to change the capacitance (average spacing between the plates 200G) periodically. As before, the boundary conditions (clamping at both ends) determine the mechanical resonance frequency of the capacitor (117).

Figure 2D:
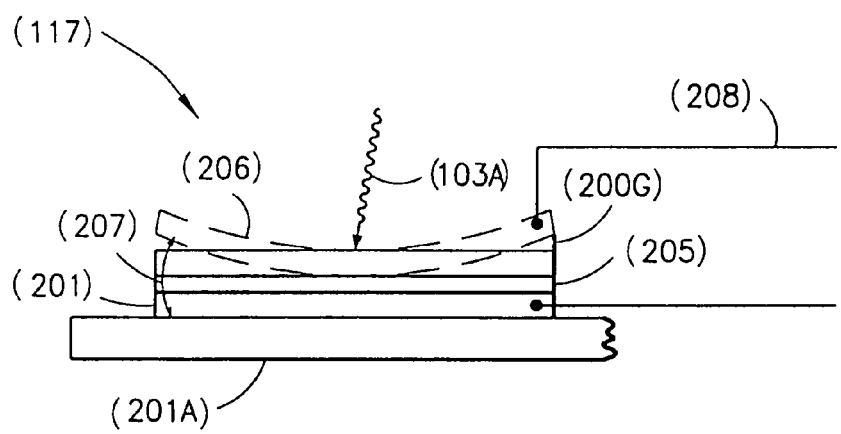
FIG. 2D is a side view of a free (unconstrained) bar acting as one plate of a preferred embodiment of the variable capacitor, where the free bar is caused to vibrate by the modulating signal(s).

See FIG. 2D. Another preferred embodiment is to have the bar free at both ends (206) separated by a thin dielectric (205) from the opposite plate (201) with an electrically contacting element (208) attached to an end of the free bar (206) in a manner that only minimally perturbs the boundary condition at that end. Here the capacitance change is brought about by the mechanical resonant vibrations of the bending modes which result in a change from the quiescent (200G) into the instantaneous spacing (207) between the bar and the fixed plate capacitive electrode.

The dielectric (205) can be made of any one of a number of polyimides, for example.

For certain RF tag applications, the capacitor (117) can be disabled in the conventional manner by shorting out the main capacitor or part of the coil (113) using a high power RF signal, generally at the point-of-sale.

Note that in these embodiments, the capacitor plates can be any shape. Further, other constraints on the movable bar or alternatively a plate are possible. For example, when the element is a plate (206), as in FIG. 2D, it can be constrained at one or more edges or at one or more points internal to the plate, like the center. By changing these mechanical constraints, the mechanical resonance frequency of the time dependent displacement (207) of the variable capacitor (117) changes. Constraints can consist of small pins or simply glue or epoxy along an edge, part of an edge, or other point of constraint of the plate (206.)

Note that the moving plate (210) can comprise a cantilever as shown in FIG. 2B or any bar structure with various boundary conditions (both ends fixed, both ends free, etc.) as described in FIG. 2. Given this disclosure, it would be apparent to one skilled in the art, that other boundary conditions on the moving plate can result in different resonating modes. Some non-limiting alternative examples of movable plates in FIGS. 2B–2D (or movable bimorph plate(s) below) include: (1) a bar constrained at one or more sides, (2) a plate of various shapes constrained at zero or more points at the plate edge, and (3) a plate of various shapes constrained at zero (unconstrained) or more points at the plate interior, and (4) any combination of the above. The constraints can also include: constraints on the displacement and the derivatives of the displacement with respect to space (e.g. a sliding plate constrained to one plane of motion) and time (velocity constrained at a point of the plate by clamping).

Another preferred embodiment utilizes magnetic fields as a modulating signal (103A) for exciting either the cantilever or the bar (FIGS. 2B–2D) when this vibrating element, i.e. plate (202, 204, 206), contains a magnetic material. The modulating magnetic field is made to interact with the cantilever or bar by way of a force which comes about by magnetic—magnetic interaction. See FIG. 2B. This type of interaction can occur when a DC field gradient is present in the region of the ac modulating field. Alternatively, as shown in FIG. 2B the fixed capacitor plate (201) on the substrate can be fabricated from a hard magnetic material put into a remanent state that is a magnetized state of the material having a field BR. In one embodiment, the AC interrogating field will cause a soft magnetic cantilever to vibrate and thus to modulate the carrier. Maximum modulation is again achieved when the ac field is applied at the same frequency as the mechanical resonance of the cantilever.

Figure 2E:
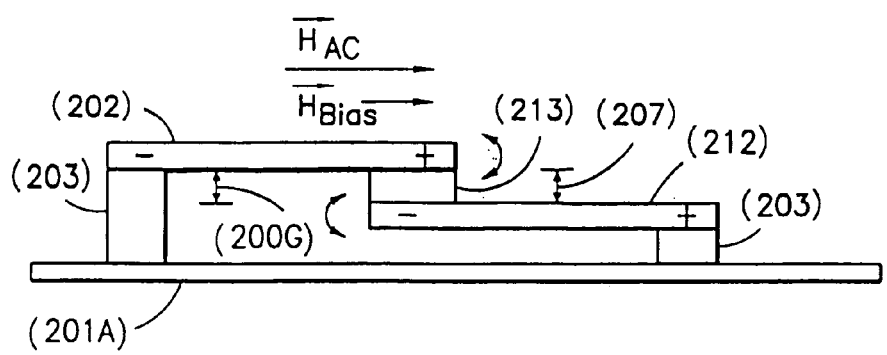
FIG. 2E is a side view of a first and a second cantilever plate that are attracted to one another by a time varying force due to a time varying magnetic field.

In one such embodiment, a configuration typically found in reed switches is used, the configuration consisting of two closely separated bars or ribbons of magnetic material, preferably soft magnetic material for the present application, shown in FIG. 2E. The two elements of the switch comprise at least one cantilever (202) which overlaps in part the second member (212). The magnetic force comes about through the polarization of the two members in the same direction so that in the overlapping region (213) the members have opposite magnetic polarity. An externally applied sinusoidal ac field causes the polarity of the two elements to reverse but the reversal is such as to always cause the two elements to attract. Thus, in the absence of an external bias field, the ac modulation frequency will be twice that of the applied sinusoidal field. In the presence of a bias field greater than the absolute value of the modulating field, the modulated frequency will equal that of the applied modulating field. However, the operation of the reed switch is not limited to any particular applied waveform. These switches can operate both with and without an external bias field. In either case, the vibration of at least one member of the switch produces a capacitive change. Maximum modulation will occur when the attractive force between the two reed switch members (202, 212) is at the same frequency as the mechanical resonance of one of the reed switch elements.

Figure 3:
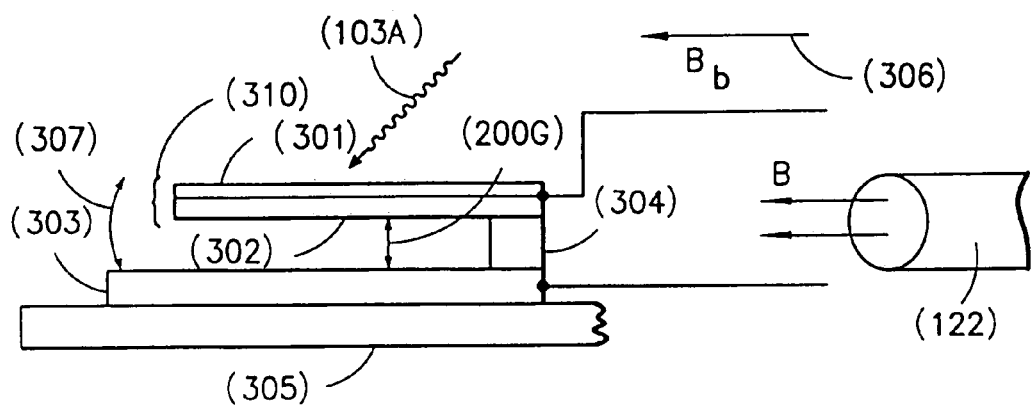
FIG. 3 shows a preferred structure in which at least one vibrating plate of the variable capacitors described in FIG. 2 comprises a bimorph.

See FIG. 3. In another preferred embodiment, a magnetostrictive material consisting of a thin foil (301) of soft magnetic material (for example, Metglas 2605SC with a composition of FeBSiC and 2605S2 with a composition or FeBSi, Allied Signal) is attached to a second material (302) to form a vibrating bimorph (310). This bimorph resonates at mechanical resonance frequencies determined by the mechanical properties described above. Because magnetostriction is an even function of the applied magnetic field, that is the elongation or constriction of the magnetostrictive material is independent of the polarity of the applied field, the resonating bimorph (310), in the absence of a DC bias field, produces a modulation in the carrier at twice the modulating signal (103A) frequency due to the time dependent capacitance changes in the spacing of the capacitor caused by the mechanical variation (307). In the presence of a DC bias field with magnitude greater than the absolute value of the applied modulating field, the modulation of the carrier will be equal in frequency to that of the applied field.

It should be clear to those skilled in the art that there also exist hard magnetostrictive materials which possess very large magnetostrictive coefficients such as terfenols which consist typically of a rare earth element with iron. However such materials require high magnetic fields for their maximum magnetostriction to occur and thus are not very practical for tag applications in which people are part of the environment in which the tags are used. However, such materials can be used as well in the manner described herein.

It is also possible to make variable capacitors with a magnetostrictive element without the use of a bimorph configuration. In that case, a DC bias field is required that is non-planar.

For optimal operation, the bimorph utilizes an additional DC field in order to be excited by a modulating field/signal (103A). The DC field can be provided by an externally applied bias field $B_b$ (306), or by the use of a magnetic material of high coercivity placed in the vicinity of the vibrating element. A preferred embodiment of the variable capacitance (117) comprises a bimorph cantilever plate (310) fixed at one end and separated from a fixed capacitor plate (303) by an electrically insulating cantilever support (304). The bimorph cantilever (310) is fabricated from a soft magnetostrictive foil (first layer 301) such as Metglas 2605CO (a trademark of the Allied Signal Corporation) attached to a hard magnetic material (second layer 302) such as iron, cobalt, nickel and any other ferromagnetic material (302). In this preferred embodiment, the magnetized hard magnetic material (302) serves to provide the DC bias field. However, other non-magnetic materials can also be used to provide a differential bending force (shear force) for the bimorph cantilever (310) when the soft magnetostrictive foil changes in length. In these embodiments, the magnetic field is provided externally (306). The external bias field (306) can be provided by a bias on the modulating signal (103A)

created by the modulating signal generator (102) and modulating signal antenna (103) and/or by an external magnetic field source.

Any of the movable plates described in FIG. 2 can be bimorphs.

Bimorph transponders/tags can be deactivated by demagnetizing the iron element in which case the tags are reusable. They can also be deactivated by disabling the capacitor or a portion of the coil circuit a strong enough signal to open circuit these elements, in which case the transponder/tag is not re-usable. Transponders can be made with multiple bimorphs (see multibit tags below) each with a second layer of a different hard magnetic material (302). In these bimorph configurations, different bimorph elements can be independently activated or deactivated using magnetic fields of different intensities applied to the individual hard magnetic elements, thereby providing a unique code on the transponder/tag. For example, to activate an individual bimorph, a magnetic field is locally applied to the bimorph (e.g. using a magnetic head) to put the hard magnetic element into a remanent state. To deactivate all bits (bimorphs) of the transponder/tag, the entire tag is placed in a region of a time decrementing oscillatory magnetic field that forces the hard magnetic element of each bimorph to a zero or near zero remanent state. Alternatively, the time decrementing oscillatory magnetic field can be locally applied to one or more of the bimorphs on the transponder/tag to deactivate individual bimorphs (bits.) This can be undertaken most conveniently at the tag manufacturing site.

Figure 4:
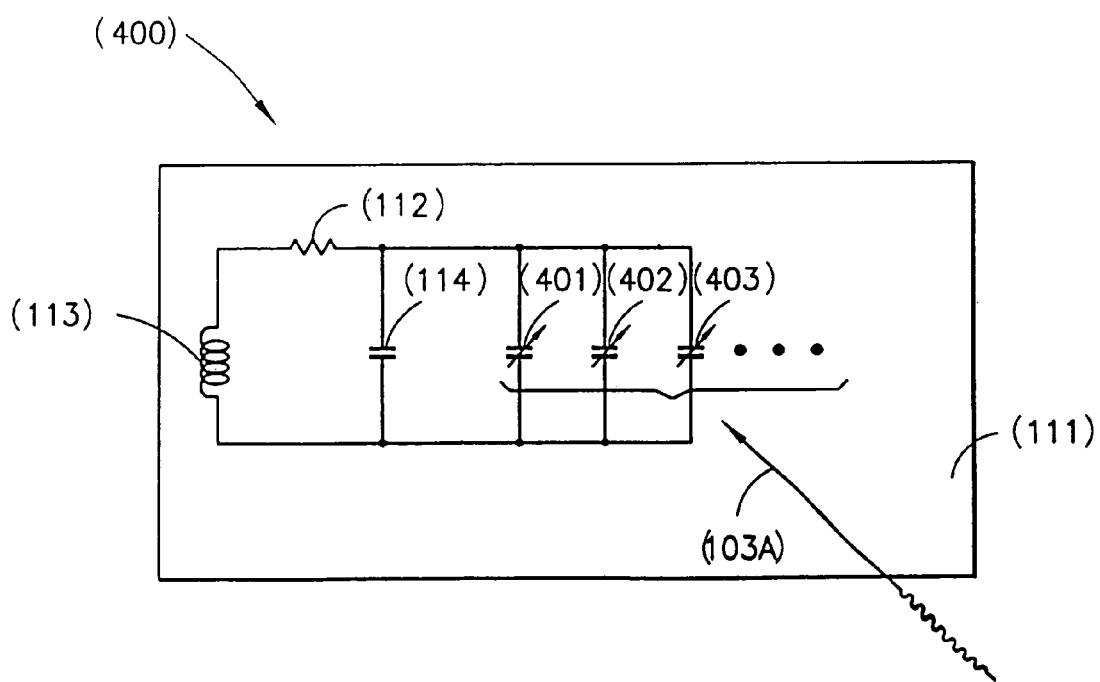
FIG. 4 is a multibit resonant circuit comprising several variable capacitors components, each varying its capacitance a greatest amount at a distinct frequency of modulating signal(s) and in combination causing the resonant circuit to resonate at a circuit resonance frequency.

Multibit transponders/tags can be made by using a single RLC circuit (125) which includes more than one variable capacitor component (117). In FIG. 4, an example of a multibit tag preferred embodiment (400) is shown with three bits embodied by three elements (401, 402, 403) each of which is a variable capacitor (117). These variable capacitors (117) can be an array of independent bars or any combination of variable capacitor (117) described in this disclosure that act as parallel capacitors in the RLC circuit.

When set to resonate by way of acoustic excitation, e.g., by the modulating signal (103A), the resonating bimorph (310) produces a modulation in the carrier frequency at the modulating signal (103A) frequency (300) due to the time dependent capacitance changes caused by the mechanical variation (307). Details of the bimorph have been described previously in a U.S. patent application Ser. No. 08/344,771 entitled "Multibit Bimorph Magnetic Tags Using Acoustic or Magnetic Interrogation" by A. Schrott et al, filed Nov. 23, 1994 which is herein incorporated by reference in its entirety.

Since the difference in amplitude between resonance and off-resonance vibration is substantial, it is possible to design a multibit tag in which each capacitor 117 (bar) can be modulated independently as each has a distinct set of mechanical resonant frequencies determined by boundary conditions and other parameters of the bar as described above. In this manner, each independent bar can modulate the resonant circuit (125) at a distinct modulating signal frequency (103A) by varying each of the variable elements (401–403) the most when the modulating signal frequency (103A) equals one of the mechanical resonance frequencies of a given capacitor (401–403). As explained in U.S. patent application Ser. No. 08/344,771 to Schrott et al. each bar can be excited sequentially or simultaneously by a linear combination of one or more excitation frequencies with independent amplitudes. If a linear combination is used as the modulating frequency (103A), a frequency analyzer, e.g., (incorporated with block 107) is required to separate the frequencies after demodulation.

The variable capacitors can each be designed to have the same value of capacitance in their unexcited state (quiescent capacitance) by scaling the bars' dimensions and their respective separation, or gap 200G, between bar (202, 204, 206) and the lower plate capacitor element. Typically, modulation of each individual bar at its mechanical resonant frequency results in a total capacitance change of approximately 2%. For example, a bar as small as 5 mm×0.5 mm×0.05 mm and a gap (200G) of 0.025 mm has a mechanical resonance at a modulating signal (103A) frequency that can be readily detected. Such changes cause an RF carrier signal (104A) modulation that is easily detected with standard amplitude modulation receivers (110). The gap (200G) inherently has a gap size with is the distance between the two plates (e.g. 201 and 202.) The gap size is changed by the vibration of one or more of the plates.

With these small sizes, an array of 20 bars (cantilevers) can be easily accommodated in area on the order of 1 cm squared to produce a (20 bit) multibit transponder (400). Since each bar (cantilever) (401, 402, 403, . . . etc.) responds independently to distinct mechanical resonance (excitation) frequencies, a code can be established consisting or "1's" and '0's'. A '1' can be assigned if excitation, i.e. the modulating signal (103A), at a given modulation frequency results in modulation of the RF carrier signal (104A). This is determined if the given modulation signal (103A) is detected at the receiver (110) indicating a '1'. Similarly, failure to produce such modulation at a given frequency corresponds to a "0". As explained above, when the bars comprise a magnetic material, they can be excited by a set of magnetic modulating frequencies. Alternatively, a set of acoustic waves of appropriate frequencies can be used as the modulating signal (103A) to cause mechanical resonance of the variable capacitors.

Figure 5A:
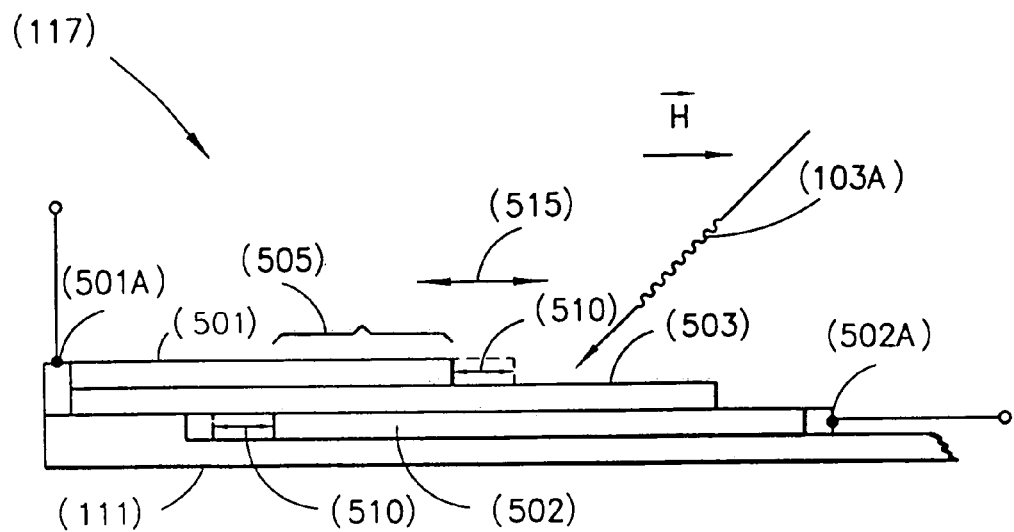
FIG. 5A (side view) and FIG. 5B (top view) are drawings of a preferred embodiment of a variable capacitor component that can vary capacitance by sliding at least one of the two capacitor plates.
Figure 5B:
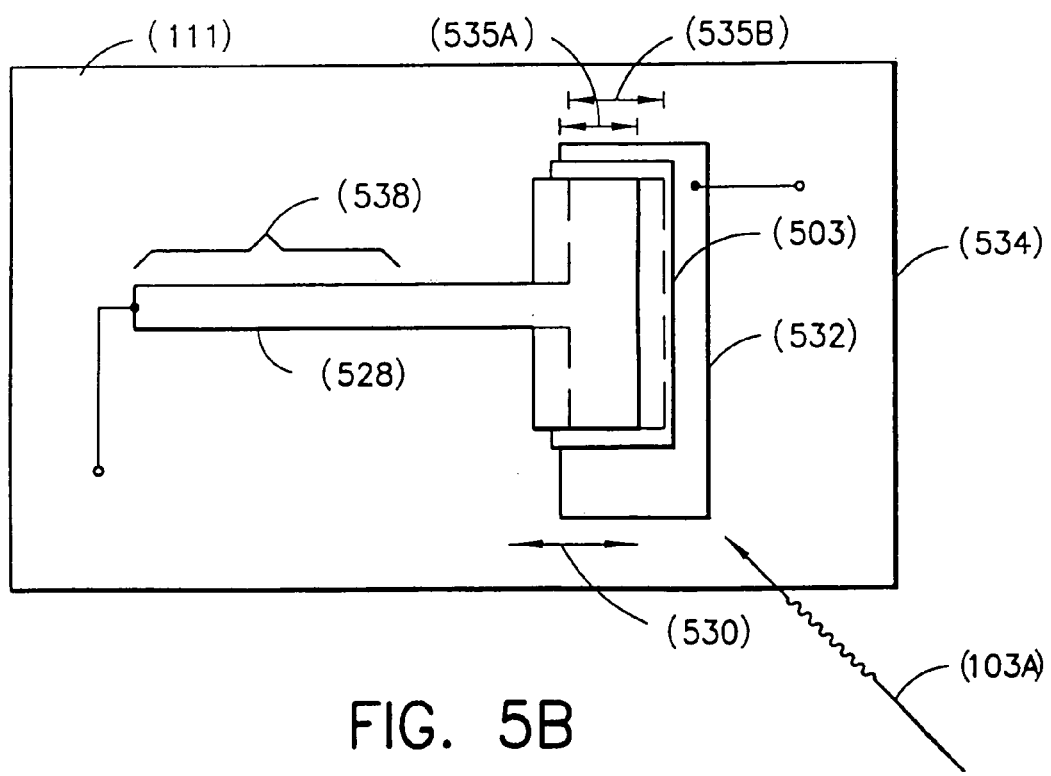
FIG. 5C is a drawing of a preferred embodiment of a variable capacitor component with a sliding plate that has a mechanically coupled restoring force.
FIG. 5D is a drawing of a variable capacitor component with one or more sliding plates that change a small gap as they slide to vary capacitance.
FIG. 5E is drawing of a capacitor component with sliding elements configured to have magnetostrictive movement in at least two nonparallel directions thereby making the capacitor variation less sensitive to orientation with respect to the field created by the modulating signal.

Other preferred embodiments for modulating (varying) the capacitance comprises two plates whose overlapping area can be varied (See FIGS. 5A and 5B). In these embodiments, the spacing (or gap size 200G) between the plates need not vary (207, 307). Capacitance varies by allowing at least one of the plates (501, 502) to slide or change its overlapped dimension (505) typically by sliding (510) one or both of the plates (501, 502) with respect to one another. In some preferred embodiments, this sliding (510) can be accomplished by the use of magnetostriction where the variable capacitor comprises two strips (501, 502) of magnetostrictive material, preferably though not necessarily biased with a small piece of magnetized hard magnetic material as described above. Examples of this magnetostrictive material include iron rich alloys such as Metglas 2605CO or other amorphous alloys of iron or cobalt.

See FIG. 5A. In a preferred embodiment, the magnetostrictive coefficient of each plate (501, 502) is chosen to maximize the change in overlap (505) upon excitation with the modulating signal (103A). Each sliding element (501, 502) is pinned (501A, 502A, respectively) at one end and the two elements are separated from one another by a thin dielectric (503), such as polyimide. The presence of modulating signal (103A) produces a mechanical oscillatory motion (variation) (515) of the plates due to the magnetostriction. The mechanical oscillation varies the capacitance (117) which modulates the resonance of the RLC circuit. Note that in this embodiment, there are no mechanical resonant frequencies of the mechanical oscillation (the mechanical oscillation of the variable capacitor is forced by the modulating signal field 103A, as a non-resonance response, because there is no restoring force on the plates (501, 502).

In FIG. 5B, an alternative preferred variable sliding capacitor (117) is in this case formed by using a single magnetostrictive element (528) sliding (530) over but separated by a dielectric (503) from a fixed metallic plate (532) deposited or attached to the substrate (534). A portion (538) of the element (528) may be magnetostrictive. For example, by making only the elongated portion (538) magnetostrictive, the entire element (538) will slide (530).

Again, the change in capacitance with time is caused by the change in the quiescent amount of area of overlap (535A) which goes into the instantaneous overlap (535B) of the upper (528) and lower (532) plates. As before, when no external restoring force is applied, the structure (528) mechanically oscillates but does not mechanically resonate, i.e. the response is non-resonance. Because of sliding friction, the amplitude of the sliding (530), i.e. the non-resonance response, is damped at high frequencies, typically 2 kHz and above. Therefore the modulating frequency range of the modulating signal (103A) includes frequencies below 2 kHz. Operation at higher frequencies is possible but with a lower sliding amplitude (530) since as the modulating signal (103A) frequency increases and the lower sliding amplitude produces a smaller variation in capacitance. The friction can be reduced, and hence the frequency of operation increased, by using a dielectric (503) with a low coefficient of friction such as teflon or polyimide. (Teflon is a trademark of the Dupont Corporation.) Alternatively, one can use a lubricant in the region where sliding occurs.

Figure 5C:
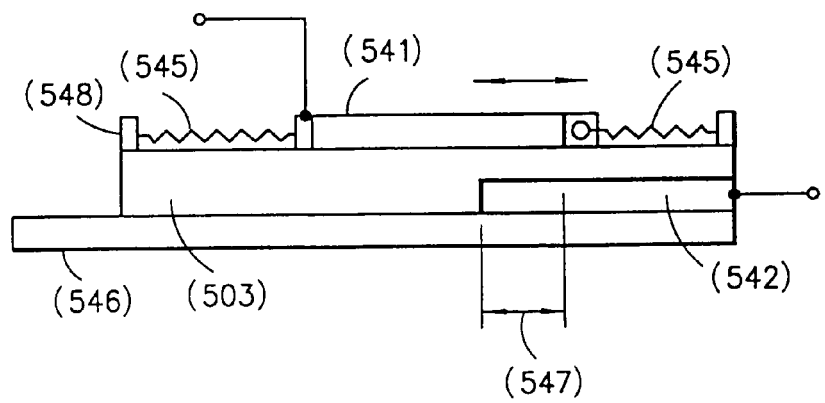

If a restoring force is supplied by way of an elastic constraint (545), FIG. 5C, a mechanical resonance can be established where the mechanical resonant frequency is directly related to the elastic constant and inversely related to the mass of the constraining material. This elastic coupling link (545) can consist of an elastic adhesive for attachment of the magnetostrictive material (541) such as a thin film or foil (541) to the substrate (546). Elastic adhesive materials used for the coupling link (545) include: silicone, elastomers, or synthetic rubber adhesives. As before, the capacitive change leading to modulation can be achieved by a change in the overlap (547) of the movable thin foil (541) with another fixed element (542), the latter (542) forming the second plate of a capacitor. Alternatively, the capacitance change can arise from a slight bowing or bending of the magnetostrictive element (541) with respect to the lower plate (542), thereby changing the spacing (gap/gap size 200G) between the capacitor plates (541, 542). In either case, the elastic constraint (545) gives rise to a mechanical resonance and the ensuing change in capacitance. Again, the plates are separated by a dielectric (503).

An array of such capacitive components can be fabricated to form a multibit tag (400) where each component can be made to resonate at a distinct mechanical frequency by providing, for example, elastic coupling (545) or links of varying elastic constants. (Note that the array can include any of the other component embodiments disclosed herein.) Each magnetostrictive element (541) can have a different mass. Alternative preferred embodiments include the magnetostrictive element (or elements 541) being pinned at one end (548) and elastically constrained (545) at the other by a leaf or coil spring. The mechanical resonance results from the restoring force on the magnetostrictive element (541). The frequency of the mechanical resonance is a function of the restoring force and the mass of the moving element and therefore can be changed for each component (bit) by changing parameters such as spring constant and the mass of the moving element.

The ensuing circuit modulation resulting from the capacitance change of each of one or more variable capacitors can be utilized to establish a code where the presence of each mechanical resonant frequency that corresponds to a "1", and the absence of a mechanical resonance at a particular frequency corresponding to a "0". The presence of each of the mechanical resonant frequencies, and hence, the coded binary information can be detected by exciting the transponder with various frequencies of the modulating signal (103A) and using the receiver (110) to determine whether or not the RF carrier signal (104A) was modulated at a given modulating signal frequency (103A). In an alternative preferred embodiment, the modulating signal generator (102) will cause the modulating signal (103A) to sweep through a range of frequencies including all (or a set of) the mechanical resonant frequencies of the multibit transponder (400). Again, presence (absence) of a modulated frequency at the receiver (110) indicates a "1" (0") in a binary code.

Figure 5D:
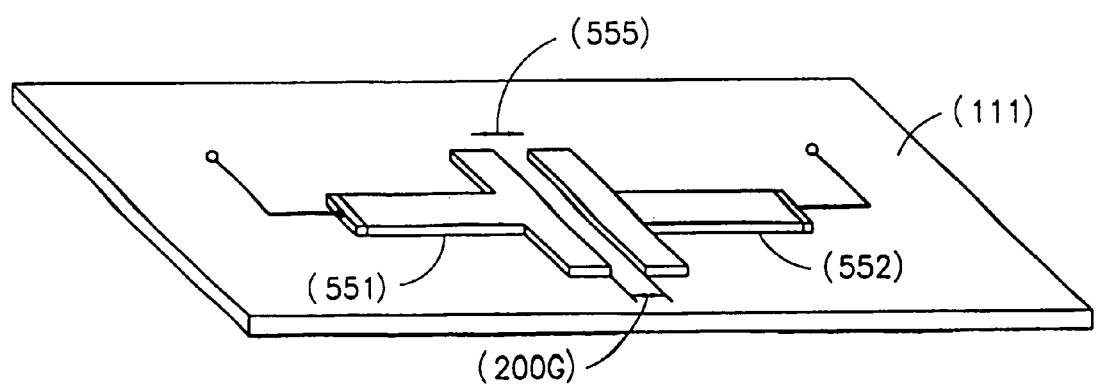

Modulation can also be achieved by the use of a non-resonant gap change. (See FIG. 5D). Here, the gap change (555), i.e., the change in the gap size (200G), is caused by a sliding magnetostrictive element (551) that forms a non-resonant variable gap (555) between the first plate (551) and a second plate (552) that is either fixed or also capable of sliding. Upon application of the modulating signal (103A), the non-resonant variable gap (555) changes at the frequency of the modulating signal (103A). This constitutes a variable capacitor (117) that changes the electrical resonance of the RLC circuit (125) causing the carrier signal (104A) to be modulated at the frequency of modulating signal (103A).

Figure 5E:
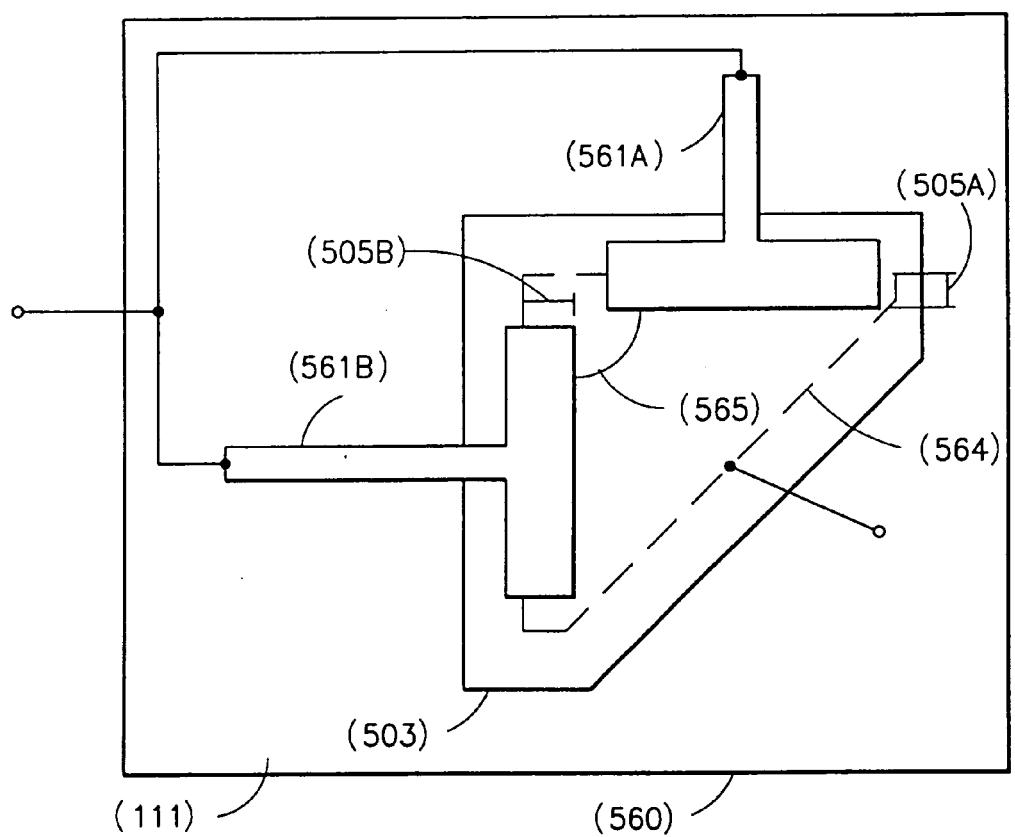

FIG. 5E shows a preferred embodiment in which two movable magnetostrictive plates (561A,B) are positioned orthogonally (angle 565) over a fixed plate (564). The fixed plate (564) is separated from each of the movable plates (561A,B) by a dielectric (503). In this configuration the transponder/tag (150) is less susceptible to the direction of the modulating signal (103A) since there are now two orthogonal positions that can be aligned with the modulating signal (103A). This embodiment makes the overlap (505A, 505B) variation less dependent on the orientation of the device (560). The angle (565) between the first (561A) and second (561 B) plate can be other than 90 degrees, i.e., non orthogonal.

Figure 6A:
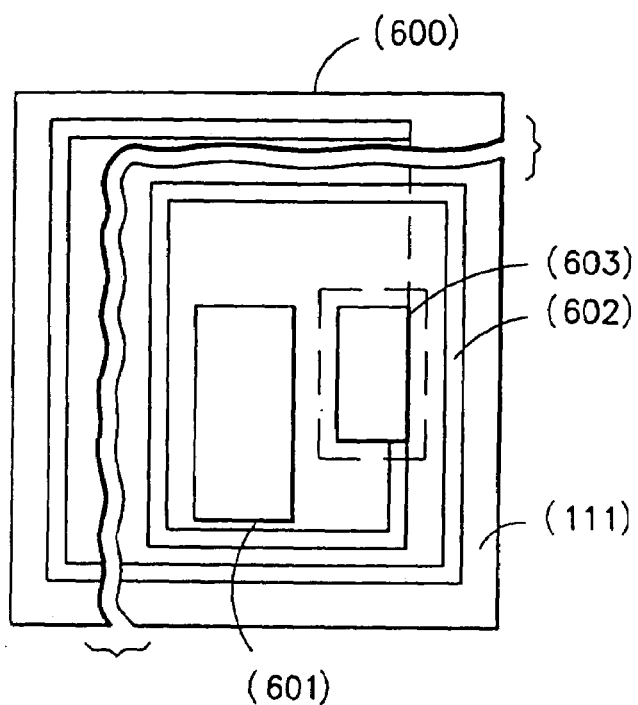
FIG. 6A is a drawing of a circuit containing a variable inductance component to modulate the resonant frequency of the resonant circuit.

FIG. 6A shows a transponder/tag (150, 600) where the modulating element of the RLC circuit (125) is a variable inductor. The variation is achieved, for example by using a ferromagnetic sheet or shim (601), preferably of low coercivity, placed in proximity to a section of a coil (inductor) (602) and in a preferred device (600), next to a fixed, i.e. non-variable, plate capacitor (603, 114). The inductor coil (602) and ferromagnetic element (601) are electrically separated. In this configuration, an applied modulating signal (103A) can drive the ferromagnetic element (601) in and out of its non linear permeability range as it sweeps out a portion of its hysteresis curve causing a change in the inductance of the coil (602). Since the inductance of a coil is equal to the flux linking an element of coil divided by the current through the coil (here the current is provided by the carrier frequency field 104A) the carrier signal (104A) will become modulated. Since the ferromagnet (601) is not a resonant element, any modulating frequency, typically in the audio frequency range, can be used to modulate the carrier.

Figure 6B:
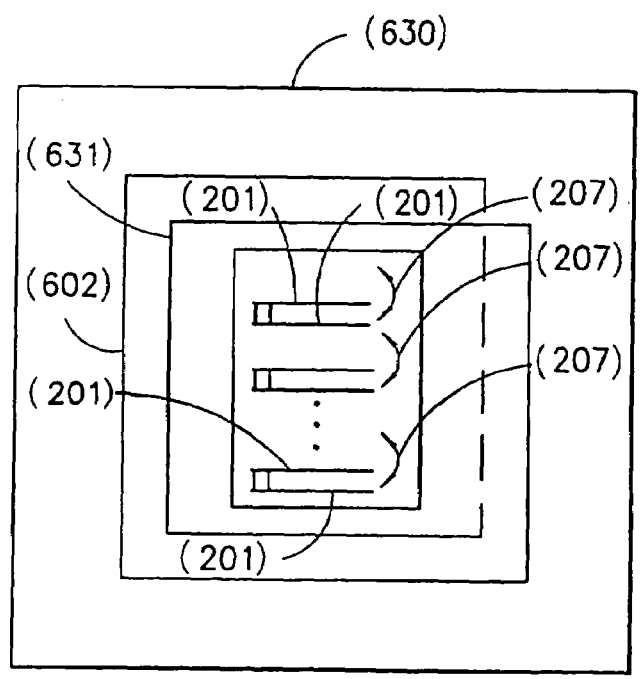
FIG. 6B is a drawing of an alternative variable inductance modulating the resonant frequency of the resonant circuit.

Alternatively, FIG. 6B shows a bank (631) of one or more cantilevers (201) constructed from a magnetic material which can couple flux through a coil on the substrate of the RLC circuit. As already described, the mechanical resonance of the cantilevers (201) can be utilized to modulate the carrier by changing the capacitance. In a similar manner, when the cantilevers are disposed near a coil, as one or more ferromagnetic sheet elements each cantilever (201) can be made to vary the inductance of the circuit by changing the flux coupling either through the displacement associated with its vibration or through the change in permeability of the cantilever due to magnetoelastic effects. In this manner, a multibit modulated tag (630) can be established through inductive changes with each modulation frequency controlled by a mechanical resonance of a cantilever (201).

Figure 6C:
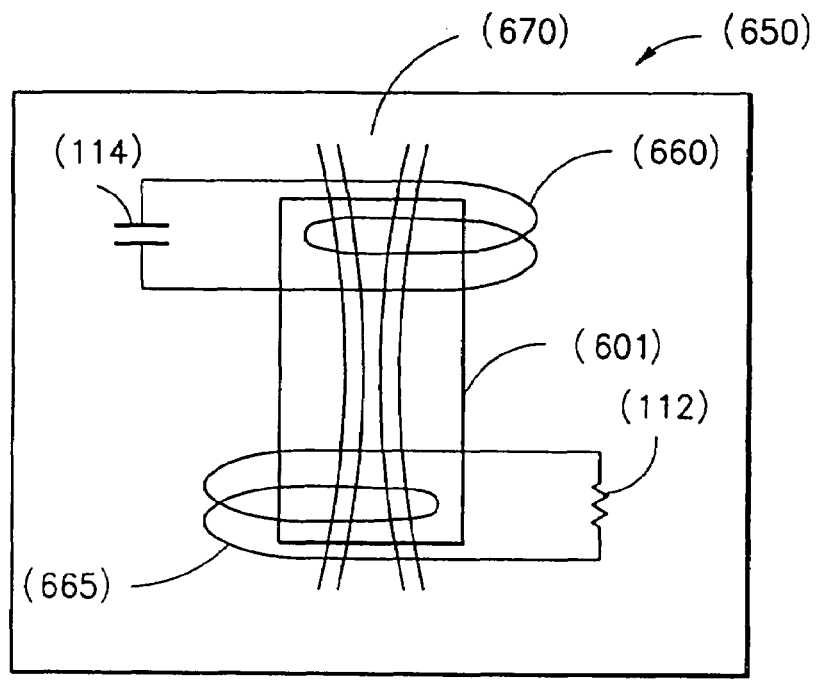
FIG. 6C is a drawing of a variable mutual inductance modulating the resonant frequency of the resonant circuit.
Figure 6D:
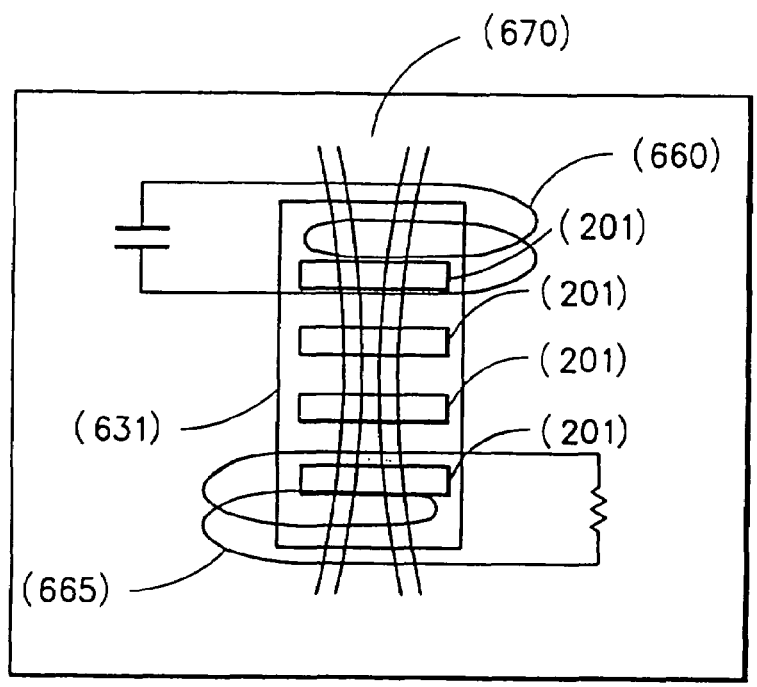
FIG. 6D is a drawing of an alternative variable mutual inductance modulating the resonant frequency of the resonant circuit.

In another embodiment (650) shown in FIG. 6C, more than one coil is used to produce variable mutual inductance (670) modulation by changing the permeability of a shim (601) used to couple the flux shared by two or more mutually coupled coils (660, 665). In an alternative embodiment, in FIG. 6D the shim (601) is replaced by a bank (631) of cantilevers (201) that vary the coupling flux (670) by changing the proximity of the mechanically vibrating plate (201) to the coils, thereby modulating the amount flux coupled to the coils.

Figure 7A:
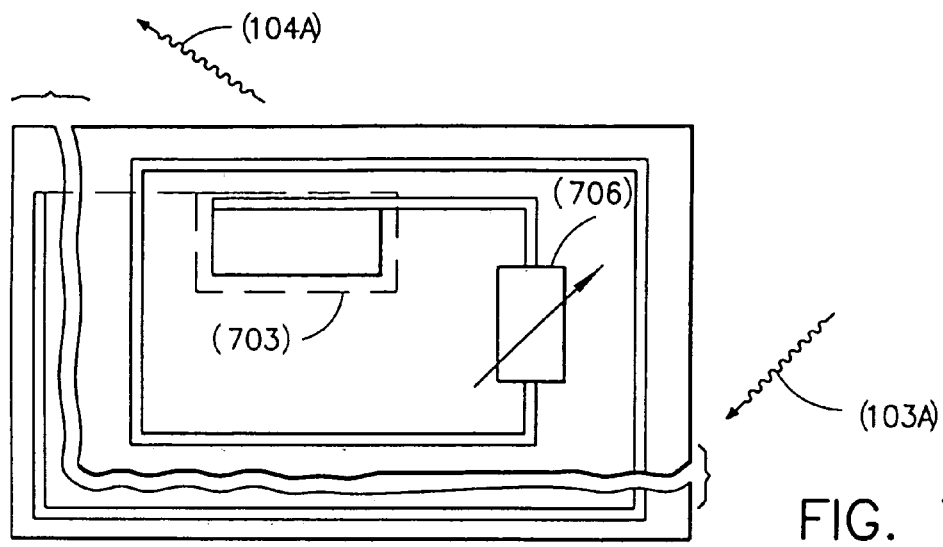
FIG. 7A is a drawing or a resonant circuit with a variable impedance component.

As shown in FIG. 7A, it is also possible to modulate the impedance of the transponder/tag (150) by inserting into the circuit a small section of material possessing magneto-impedance (706), for example, a FeCoSiB wire. The impedance is modulated by use of a low frequency magnetic field, the modulating field/signal (103A), which results in a modulated carrier signal (104A). In this preferred embodiment, the impedance being varied is complex, i.e., both resistive (115) and inductive (116) components vary.

Figure 7B:
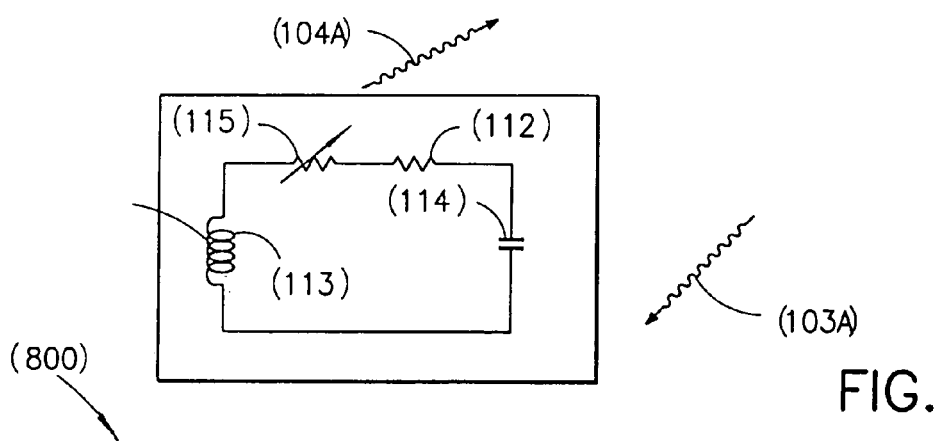
FIG. 7B is a drawing of a circuit with a variable impedance component that is primarily varies in resistance.

In another embodiment, FIG. 7B, the impedance variation is primarily resistive (115). Here a change in resistance with magnetic field, modulating field/signal (103A), causes modulation in the carrier (104A) by changing the Q (proportional to the dissipation or loss at resonance) of the resonant circuit (125) resulting in the amplitude change of the signal at the modulating frequency. For this to occur, a metal or semiconductor exhibiting magnetoresistance is inserted in the circuit (125) as the variable resistance (115), typically in series with the coil (113). Metals or semiconductors exhibiting these effects include certain oxides of Mn known as colossal magnetoresistive materials (CMR's). Other magnetoresistive materials include: Bi, Cd, and Sb.

The RLC circuit can be made by simple metal deposition on an insulating substrate followed by etching techniques, well known by those skilled in the art. The cantilevers and sliding elements can be fabricated by micromachining or stamping techniques. Magnetic films can be disposed onto cantilevers to form bimorphs by lamination, plating, vapor or plasma deposition. The moving assembly can be attached to the substrate by means of any number of known adhesives. Since all motion or movements of elements of the assembly involve small displacements, the modulating assembly can be encapsulated without interfering with the motion of the assembly or its elements.

Figure 8:
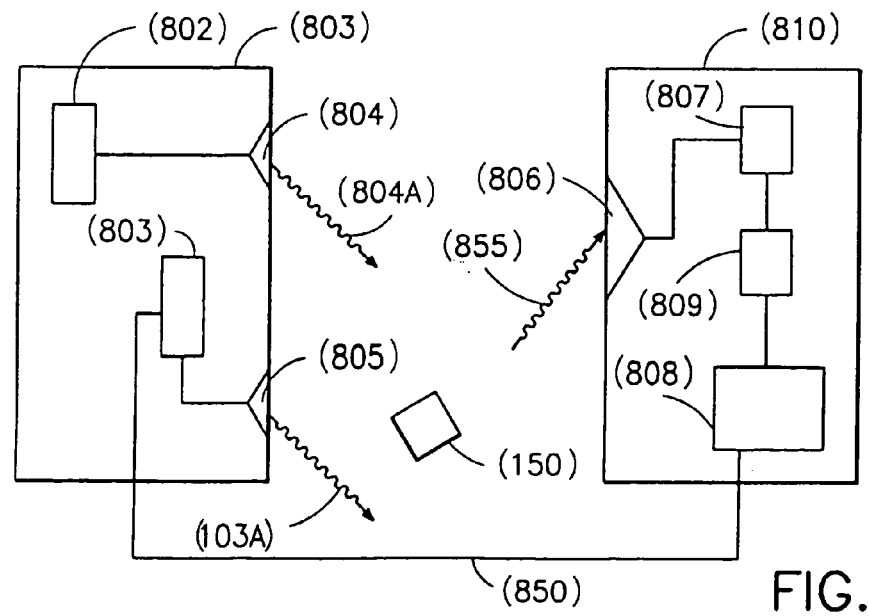
FIG. 8 is a block diagram of an interrogation detection system used with the transponders/tags with variable resonant circuits and a frequency modulation (FM) embodiment.

FIG. 8 is a schematic of the interrogator (801) and the receiving units (810). The interrogator (801) contains an RF generator (802) which sends out a periodic or continuous RF signal (804A), typically in the megahertz frequency range. In addition, a second generator (803) transmits a lower frequency modulating signal or series of modulating signals (103A) at one or more frequencies, preferably in the audio range, to modulate the variable circuit element of the transponder/tag (150). The interrogating signals are propagated by suitable antennas (804, 805) such as single loops of wire to excite the tag resonant circuit (125) with both a carrier (804A) and a modulating signal (103A), In the case of acoustic excitation, (805) corresponds to a loudspeaker. The receiving coil (806) detects only the carrier frequency (804A) in the absence of a tag within its operative range. In that case, the receiver (807) rectifies (demodulates) the carrier which gives rise to a dc signal and no further response by the detection circuit, i.e., the detector receives no coded signal. In the presence of a tag, either single or multibit, the carrier is amplitude modulated (855) with one or more modulation frequencies of the modulating signal (103A). For multibit tags, a computer (808) determines which modulation frequencies are present in the modulated carrier (855) by detecting the signal using for example, fixed band pass filters (809). If interrogation uses multiplexed signals, the receiver (801) can determine the tag code by comparing transmitted voltages at pre-determined frequencies that establish a code.

In an alternative embodiment of system (800), frequency modulation (FM) can also be used for interrogation and demodulation. For example, FM can be achieved by the use of a feedback circuit (850) linking the carrier transmitter and the tag signal receiver. This feedback (850) is made to change the frequency of the carrier (804A) to maintain a constant amplitude of the modulated signal (855) at the receiver (810). The variation of frequency of the carrier signal (804A) constitutes frequency modulation (FM) at the frequency of the modulating signal (103A). The frequency variation can be achieved by a voltage controlled oscillator (VCO) having a voltage control signal determined by the feedback signal (850), e.g. the difference between the amplitude of the modulated signal (855) and a set point.

Figure 9:
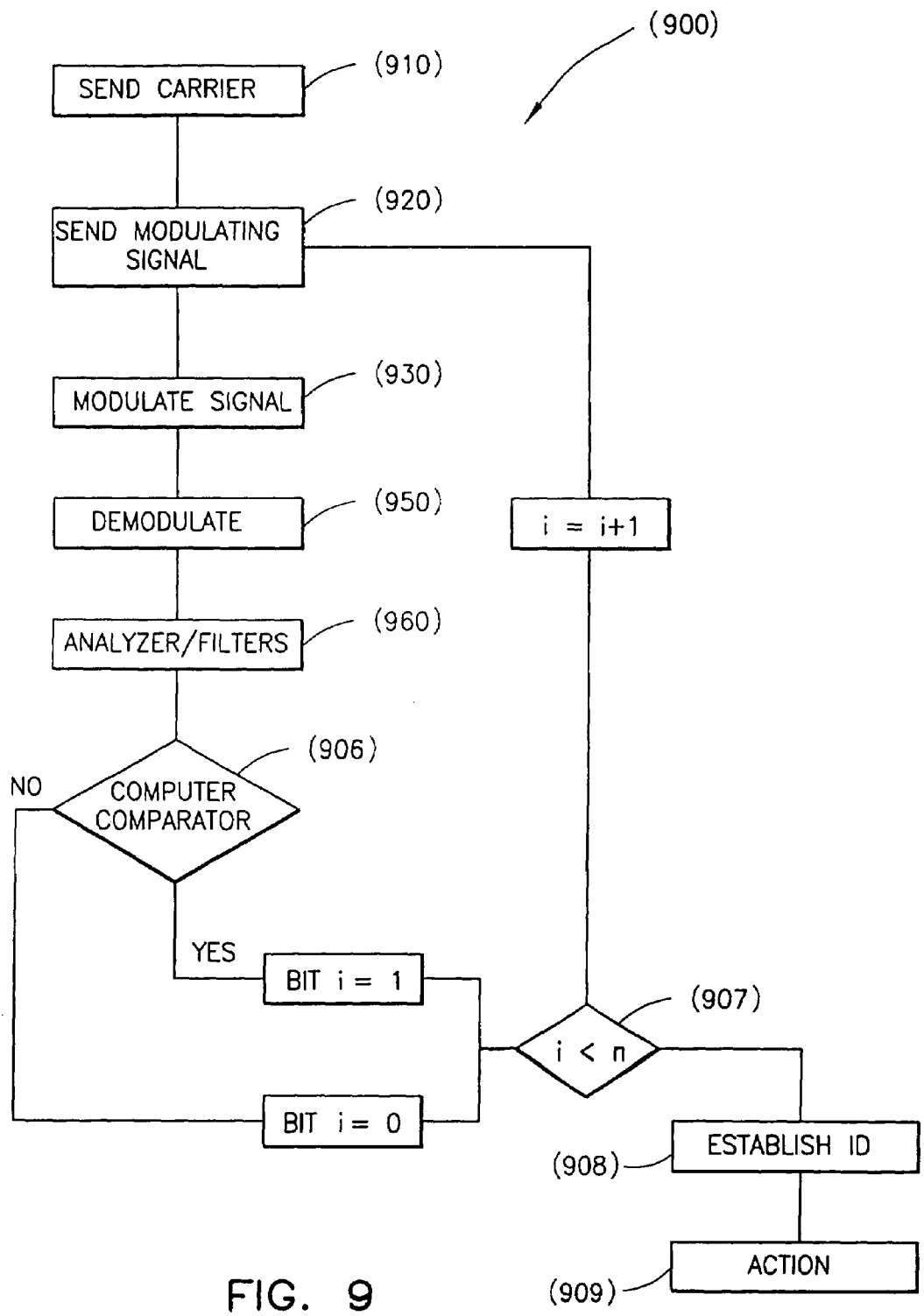
FIG. 9 is a flow chart of a preferred method with steps for sending an interrogation signal and analyzing the detected signal from the transponder/tag.

FIG. 9 is a flow chart showing the method steps performed further by the tag (150), interrogation and sensing system. The interrogation consisting of sending (910) the RF carrier signal (104A) and sending (920) the modulating signal (103A) simultaneously from separate antennas (104, 103). The tag (150) is interrogated via these signals i.e., the transponder (150) modulates (930) the carrier (104A) with the modulating signal (103A). A pickup antenna (105) detects (940) the modulated signal (155). The modulated carrier (155) is demodulated (950) by a receiver typically an AM receiver, with the signals sensed by a frequency analyzer (960) or a predetermined set of narrow bandpass filters (960). These signals are compared with those frequencies in memory (906) of a computer. The frequencies in the computer memory are those frequencies that correspond to the set of resonant frequencies assigned to all possible bits of the tag. For a multibit tag, the computer comparison enables the item to be identified since the presence or absence of frequencies, $f_i$, can correspond to a '1', '0' code respectively.

After interrogating the entire set of frequencies within the computer memory (907), information about an item attached to the transponder/tag (150), gives the identity and/or status (908) of the item. For example, in an electronic article surveillance (EAS) application, the status indicates that the item has not been paid for and an alarm (909) will be activated. The computer (107, 808) will also record what item is being stolen. This type of data can be useful in providing information regarding frequency of attempted theft leading to necessary theft prevention countermeasures.

In one specific use in a retail environment, the tag (150) will be deactivated at a point of sale when tendering for the item to which the tag is attached occurs. If the item is not paid for, the tag will not be deactivated, i.e., the tag remains active. Active tags are sensed at an exit of the store using method (900) which causes an alarm to sound. Once the item has passed through the interrogation gate and been identified or once the theft alarm has sounded, the system is reset and the modulation frequency registers are cleared for passage of the next tag.

The circuits can be disposed on a flexible substrate suited for attachment to small items, such as those used today in retail pharmacies and groceries. They can be encased in a paper or cardboard cover. In these applications, the tags (150) need not be configured for re-use and can be deactivated destructively. For tags on more expensive items, the tag and its substrate can be encased in a plastic covering as is well known in the art, allowing it to be removed from the attached article and reused. Here deactivation can be non-destructive if desired or the tag may be left in the active state for reuse.

In an alternative preferred embodiment, the modulating signal (103A) is not transmitted. In this embodiment, the transponder/tag (150) will respond by absorbing (104AB) the highest amount of energy from the carrier signal (104A, 108A) when the carrier signal frequency is equal to the resonant frequency of the resonant circuit (125). By sensing this "dip" in the RF signal (104A, 804A), the system 800 (175) can determine that a transponder/tag (150) is within the range of the RF signal (104A, 804A).

Personalization of the modulated RF tag containing cantilevers or vibrating bars can be achieved in a number of ways using computer control. Since modulation occurs due to mechanical resonances of a modulating elements, e.g., cantilevers or bars, personalization is achieved by selectively enabling or disabling any resonating member producing modulation. In general this can be achieved either by mechanical means or by altering the magnetic coupling of the resonating structure with respect to the modulating magnetic field.

Figure 10:
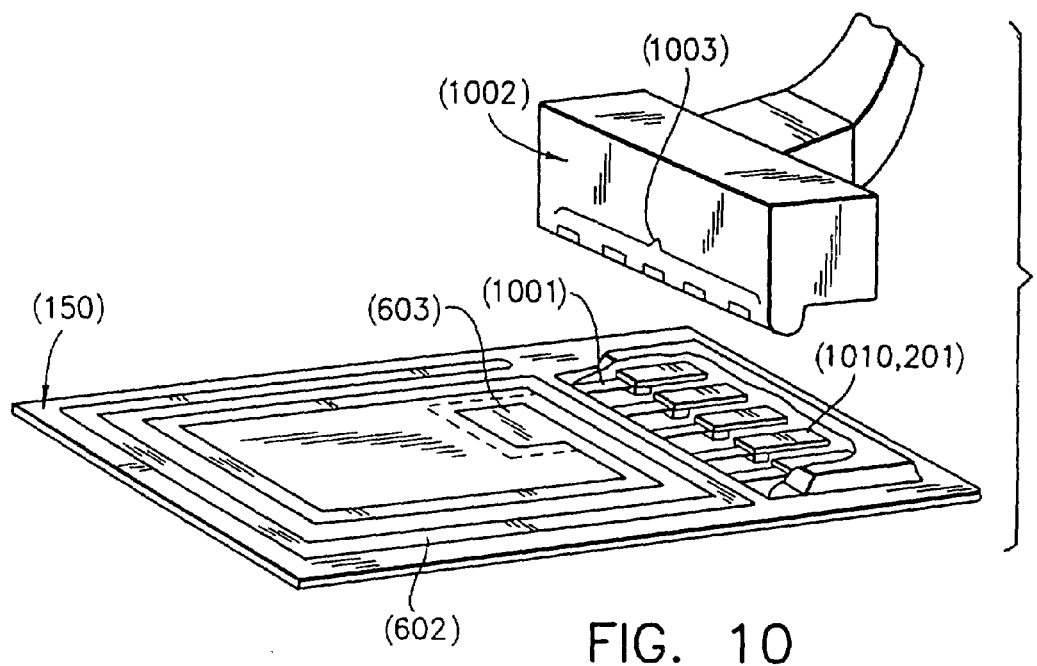
FIG. 10 is a drawing of an illustration of an embodiment used to "personalize" the resonant circuit.

FIG. 10, is an illustration of the method for personalizing the cantilevers or bars of tag (150) utilizing magnetic means discussed in the description of FIG. 3 above. Here, each cantilever (1010, 201) has an individual bias magnet (1001) that can be magnetized or demagnetized using a magnetic head (1002). In a preferred embodiment the magnetic head contains multiple elements (1003) that fit over each bias element of the vibrating members of the tag. The computer is programmed to activate the head in such a way that it magnetizes or demagnetizes the magnetic cantilever element. Activation is achieved by means of a local dc field while deactivation is accomplished by a local decrementing ac magnetic field. To avoid cross talk, a preferred method of using this multi-element head is to address each element of the head sequentially rather than simultaneously. As known in the art of recording magnetic media, the close proximity of the head (1002) to the bias magnet (1001) only effects that respective bias magnet (1001) to which the head (1002) is near.

Figure 11:
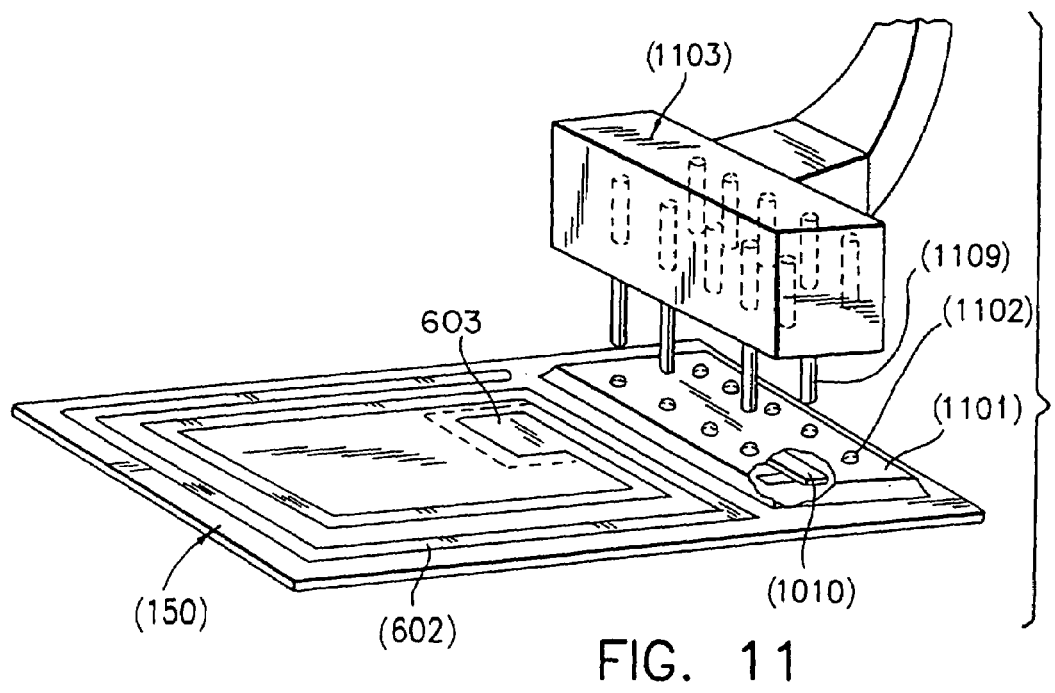
FIG. 11 is a drawing of a locking/unlocking mechanism for vibrating members used to "personalize"the resonant circuit.

Mechanical means includes a locking/unlocking mechanism for each individual vibrating member. This is shown in an embodiment in FIG. 11. The tag (150) includes a thin cover (1101) which contains dimpled areas (1102), positioned over each vibrating element (1010) in a region in which vibration occurs. The dimple (1102) can be positioned to be in contact with the vibrating element (1010) in which case vibration is frozen, i.e. the element is disabled. Conversely, the dimple can be in a position such that no contact is made with the vibrating element thereby leaving the element enabled.

Personalization is achieved by selecting the elements to be enabled or disabled. The cover (1101) is fabricated from a material that can locally be deformed without damage by applying a sufficient pressure, either by mechanical means or air pressure or combination of mechanical and air pressure. This material preferrably should be capable of being injected molded, e.g., polyvinyldifluoride (PVDF) or polytetrafluoroethylene. The personalizing head (1103) contains one or more elements (1109) that can access each of the vibrating elements to be personalized by either pushing, pulling or providing positive or negative air pressure to change the dimple curvature.

Alternatively, the dimple can be pivoted so that pushing in either one of two locations will alter its state or position relative to the vibrating element, thereby enabling or disabling the vibrating element.

Alternative equivalent embodiments, within the scope of this invention and within the contemplation of the inventors will become apparent to one with skill in the art that is given this disclosure.

We claim:

1. A transponder comprising a circuit having two or more circuit components that determine a response of the circuit, at least one of the circuit components varying in response to an external modulating energy field so that the circuit response changes, where the circuit components comprise one or more variable capacitors, and where at least one of the capacitors is a plate capacitor having one or more first plates and a second plate, the first and second plates being separated by a gap having a gap size, and where at least the first plate has a movement in response to the external modulating energy field, the movement causing the capacitance of the capacitor to vary.

2. A transponder, as in claim 1, where one or more of the first plates is a constrained plate being constrained at zero or more points by a constraint and the constraints determine one or more mechanical resonance frequencies of the constrained plate.

3. A transponder, as in claim 2, where the movement is a non-resonance response to the external modulating energy field and the external modulating energy field has a frequency not equal to any of the mechanical resonance frequencies of the constrained plate.

4. A transponder, as in claim 1, where the movement of the first plate causes a change in the gap size between the first and second plate.

5. A transponder, as in claim 4, where the external modulating energy field has a modulating frequency and the movement is a vibration of the first plate at the modulating frequency.

6. A transponder, as in claim 5, where the change in the gap size is greatest when the modulating frequency is equal to any one of the mechanical resonance frequencies.

7. A transponder, as in claim 4, where the external modulation energy field is an acoustic field.

8. A transponder, as in claim 2, where the constrained plate is a cantilever having a first and second end and the first end is constrained by being fixably attached to a support and the second end is unconstrained to permit the movement, the movement being a vibration changing the gap size.

9. A ponder, as in claim 2, where the constrained plate is a bar having a first and second end and the first end and second end are constrained by being fixably attached to a support the bar further capable of a transverse mechanical motion at one or more of the mechanical resonance frequencies in a direction that changes the gap size.

10. A transponder, as in claim 2, where the constrained plate is constrained at zero points, therefore being an unconstrained plate capable of a transverse mechanical motion at one or more of the mechanical resonance frequencies in a direction that changes the size.

11. A transponder, as in claim 1, where the first plate is a bimorph, the bimorph having a first and second layer.

12. A transponder, as in claim 11, where the external modulating energy field includes any one of the following: an acoustic field, an electromagnetic field varying at a modulating frequency, and an electromagnetic field varying at a modulating frequency with a DC magnetic bias.

13. A transponder, as in claim 11, where the first layer is made of a magnetostrictive material.

14. A transponder, as in claim 13, where the second layer is made of a coercive material left in a remanent state with a coercivity greater than an amplitude of the external modulating energy field.

15. A transponder, as in claim 14, where a change in gap size is greatest when a modulating frequency of the external modulating energy field is equal to a mechanical resonance frequency of the first plate.

16. A transponder, as in claim 13, where the external modulating energy field is an electromagnetic field and the change in the gap size is greatest where a modulating frequency of the modulating energy field is equal to one half of the frequency of one the mechanical resonance frequencies of the first plate.

17. A transponder, as in claim 2, where the external modulating energy field is a time varying magnetic field and the each of the first plates and each of the second plates have an area of overlap, the first and second plates consisting of soft magnetic material, the first plates being cantilevers with a first and a second end, the first end being constrained and the second end being free to move, the second end of the first plate being attracted to the second end of the second plate with a time varying force due to the presence of the time varying magnetic field, the time varying force causing a mechanical vibration of the plates, the capacitance of the capacitor formed by these two plates changing due to a change in the gap size caused by the mechanical vibration.

18. A transponder, as in claim 2, where the energy field is a time varying magnetic field and the first plate is in the presence of a non-uniform magnetic bias field, the first plate comprising any one of the following: a magnetostrictive material and a soft magnetic material.

19. A transponder, as in claim 18, where the magnetic bias field is supplied by any one of the following: an externally applied spatially non-uniform magnetic field and the second plate being made from a high coercivity material left in a remanent state.

20. A transponder, as in claim 1, where at least a portion of the first plate is capable of slidably moving with respect to the second plate to change the gap size.

21. A transponder, as in claim 1, where, in response to the external modulating energy field, at least a portion of the first plate and a portion of the second plate are capable of slidably moving with respect to one another to change the gap size.

22. A transponder, as in claim 20, where the first plate is made of a magnetostrictive material and is caused to slidably move when excited by the external modulating energy field, the external modulating energy field being a magnetic field varying at a modulating frequency.

23. A transponder, as in claim 22, where the first plate is attached to an elastic link that provides a restoring force allowing the first plate to mechanically resonate at one or more mechanical resonance frequencies in response to the modulating magnetic field.

24. A transponder, as in claim 1, where the first plate and the second plate are configured to have an area of overlap, and the movement of the first plate causes a change in the overlap area in manner to vary the capacitance of the capacitor.

25. A transponder, as in claim 24, where the first plate is made of a magnetostrictive material and slides in response to the external modulating energy field, the external modulating energy field being an electromagnetic field.

26. A transponder, as in 24, where the first plate is constrained by an elastic link that provides a restoring force giving rise to one or more mechanical resonant frequencies of the first plate.

27. A transponder, as in claim 26, where the overlap change is the greatest under any one of the following conditions:
  a. a modulating frequency of the external modulating energy field is equal to one half of one of the mechanical resonant frequencies, and
  b. the external modulating energy field has an AC part and a DC part, the DC part is greater than a peak amplitude of the AC part and the modulating frequency is equal to one of the mechanical resonant frequencies.

28. A transponder, as in claim 24, where two or more of the first plates slide in a plane parallel to the second plate, each of the first plate sliding directions being non-parallel with one another.

29. A transponder comprising a resonant circuit having two or more electromagnetic energy storage components that determine a circuit resonance frequency of the resonant circuit, at least one of the electromagnetic storage components varying in response to an external modulating energy field so that the circuit resonance frequency changes,
  where one or more of the electromagnetic storage components is a variable inductor comprising:
    (a) a coil; and
    (b) a flux changing element, the flux changing element varying the inductance of the variable inductor by changing a flux of the variable inductor non-linearly with respect to a change of current flowing in the variable inductor.

30. A transponder, as in claim 29, where the flux changing element is a ferromagnetic sheet that is driven in and out of a non-linear range of a hysteresis curve of the ferromagnetic sheet by the external modulating energy field.

31. A transponder, as in claim 29, where the flux changing element is one or more moving plates in proximity to the coil, where said plates are constrained at zero or more points by a constraint and the constraints determine one or more mechanical resonant frequencies of the constrained plates, the plates being moved by the external modulating energy field.

32. A transponder, as in claim 29, where the flux changing element is one or more mutual inductances coupled to the coil by the flux.

33. A transponder, as in claim 32, where the coupling is varied by a ferromagnetic sheet that is driven in and out of a non-linear range of a hysteresis curve of the ferromagnetic sheet by the external modulating energy field.

34. A transponder, as in claim 32, where the coupling is varied by one or more moving plates in proximity to the coil, where said moving plates are constrained at zero or more points and the constraints determine one or more mechanical resonant frequencies of the constrained plates, the plates being moved by the external modulating energy field.

35. A transponder comprising a resonant circuit having resonant circuit components comprising two or more electromagnetic energy storage components that determine a circuit resonance frequency of the resonant circuit, at least one of the resonant circuit components varying in response to an external modulating energy field so that a characteristic of the resonant circuit changes, where one or more of the resonant circuit components is a variable impedance, the variable impedance being a material exhibiting magneto-impedance changed by the external modulating energy field, the external modulating energy field being an electromagnetic field.

36. A transponder, as in claim 35, where the variable impedance is made of a magnetoresistive material including any of the following: permalloy, Sb, Bi, non-magnetic/magnetic layered compounds such as copper-permalloy, manganese oxides.

37. A transponder, as in claim 35, where the material is a soft magnetic wire comprising the alloy FeCoSiB.

38. A transponder comprising:
a resonant circuit having two or more electromagnetic energy storage components that determine a circuit resonance frequency of the resonant circuit; an external modulating energy field, having one or more modulating waveforms;
one or more of the electromagnetic energy storage components being a varying component, the varying component being varied in response to one or more of the modulating waveforms of the external modulating energy field, the varying component causing the circuit resonance frequency to change; and an electromagnetic carrier field with a carrier frequency, the carrier frequency being modulated in response to change in the circuit resonance frequency to encode information on the carrier frequency.

39. A transponder, as in claim 38, where the information is a binary code having one or more bits, each bit having a bit value, and each bit value is capable of indicating the presence and absence of change in the circuit resonance frequency.

40. A system for obtaining information from a transponder, comprising:
a base station that transmits an electromagnetic carrier field with a carrier frequency and an external modulating energy field, the external modulating energy field having one or more modulating waveforms;
a transponder having a resonant circuit with two or more electromagnetic energy storage components that determine a circuit resonance frequency of the resonant circuit, one or more of the electromagnetic energy storage components being a varying component, each of the varying components being varied by one or more of the modulating waveforms, the varying component causing the circuit resonance frequency to change thereby modulating the carrier field to encode information on the carrier field; and
a receiver for receiving the modulated carrier field and detecting the information on the carrier field.

41. A system, as in claim 40, where the carrier field is modulated with amplitude modulation.

42. A system, as in claim 40, where the carrier field is modulated with frequency modulation.

43. A system, as in claim 40, where the transponder is a tag on an object and the information describes the object.

44. A system, as in claim 40, where the information is a binary code having one or more bits, each bit having a bit value, and each bit value is capable of indicating the presence and absence of one of the modulating waveforms.

45. A system, as in claim 40, where the external modulating energy field includes any one of the following: an acoustic field, an electromagnetic field, and an electromagnetic field with a magnetic DC bias.

46. A method of creating a modulated carrier field comprising the steps of:
transmitting an electromagnetic carrier field and an external modulating energy field, the electromagnetic carrier field having a carrier frequency and the external modulating energy field having one or more modulating waveforms; and
modulating the carrier field with a transponder, the transponder having a resonant circuit with two or more electromagnetic energy storage components that determine a circuit resonance frequency of the resonant circuit, one or more of the electromagnetic energy storage components being a varying component, each of the varying components being varied by one or more of the modulating waveforms, the varying component causing the circuit resonance frequency to change thereby modulating the carrier field.

47. A method, as in claim 46, where the the electromagnetic carrier field and the external modulating energy field are transmitted by a base station.

48. A method, as in claim 46, where the modulating waveforms cause modulation of the carrier field which represents information.

49. A method, as in claim 48, where the modulated carrier field is received by a receiver that demodulates the modulated carrier field to obtain the information.

50. A transponder comprising:
a resonant circuit having resonant circuit components comprising two or more electromagnetic energy storage components that determine a circuit resonance frequency of the resonant circuit;
an electromagnetic carrier field with a carrier frequency and having an absorbed part, the absorbed part being an amount of energy of the carrier field being absorbed by the resonant circuit, the absorbed part being greatest at the circuit resonance frequency; and
at least one of the resonant circuit components being directly responsive to an energy field impinging directly thereon to change the energy of the carrier field absorbed by the resonant circuit;
where the carrier field further comprises a reflected part and a transmitted part, the reflected part being a reflected amount of energy of the carrier field being reflected from the resonant circuit and the transmitted part being a transmitted amount of energy of the carrier field that passes through the resonant circuit, where all of the energy of carrier field equals the sum of the absorb part, the reflected part, and the transmitted part, and where the at least one of the resonant circuit components changes the circuit resonance frequency to modulate the absorbed part, reflected pant, and transmitted part.

* * * * *